US006183043B1

(12) United States Patent
Nelson

(10) Patent No.: US 6,183,043 B1
(45) Date of Patent: *Feb. 6, 2001

(54) SEAT WITH AN ADJUSTABLE ABUTMENT PORTION

(76) Inventor: Paul Damian Nelson, Suite 102, 15 Albert Avenue, Broadbeach, Queensland 4218 (AU)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/973,686
(22) PCT Filed: May 7, 1996
(86) PCT No.: PCT/AU96/00273
§ 371 Date: Dec. 12, 1997
§ 102(e) Date: Dec. 12, 1997
(87) PCT Pub. No.: WO97/00192
PCT Pub. Date: Jan. 3, 1997

(30) Foreign Application Priority Data

Jun. 14, 1995 (AU) .................................................. PN3505

(51) Int. Cl.[7] .................................................. B62J 1/00
(52) U.S. Cl. .................................. 297/201; 297/215.13
(58) Field of Search .................................. 297/195.1, 201, 297/284.1, 215.15, 215.1, 215.11, 215.12

(56) References Cited

U.S. PATENT DOCUMENTS

| 595,434 | * | 12/1897 | Burge ...................................... 297/201 |
| 616,178 | * | 12/1898 | Barron ..................................... 297/201 |
| 654,835 | * | 7/1900 | Mandl ................................... 297/201 X |
| 694,875 | * | 3/1902 | Mergham .............................. 297/201 |
| 1,146,675 | * | 7/1915 | Weed .................................. 297/215.12 |
| 3,873,127 | * | 3/1975 | McNichol, Jr. et al. ... 297/215.12 X |
| 3,913,974 | * | 10/1975 | Bowen ......................... 297/215.12 X |
| 5,123,698 | * | 6/1992 | Hodges ................................... 297/201 |
| 5,203,606 | * | 4/1993 | Granzotto .............................. 297/201 |
| 5,340,192 | * | 8/1994 | Hsh . |

FOREIGN PATENT DOCUMENTS

8579 * of 1913 (GB) .................................... 297/201

* cited by examiner

Primary Examiner—Milton Nelson, Jr.
(74) Attorney, Agent, or Firm—Larson & Taylor, PLC

(57) ABSTRACT

A seat has a surface portion (12) and an abutment portion (30) which is moveable out of the seat portion (12) by a spring biasing mechanism (40). The mechanism (40) includes rod (44) and locking pin (57) which can lock the rod (44) in position to hold the abutment portion (30) in a predetermined position. Seat mounting mechanisms are also disclosed which include clamp assemblies which have quick release compression cam fasteners (328, 382) for locking a seat in a desired position relative to the mounting mechanisms. Other mounting mechanisms include spring arrangements (411, 405) for biasing a seat forward and locking mechanisms (420) may be included for locking the seat in a predetermined position. One seat mounting includes an arcuate guide sleeve (506) which moves relative to a block (501) so the seat (500) can be moved along an arcuate guide path. Another mounting includes post segments (576) and (577) which are pivotally connected together and bias by a spring (587) into certain disposition. A compression lock (584) is provided for locking the segments (575, 577) together. Another seat embodiment the invention includes spring metal seat portion (804) which flex and conform to a user's anatomy depending on the shape of the anatomy and load applied. Support members are also provided which include a plurality of elements (610) which are biased by spring and rod assemblies (656) to place the elements in predetermined positions.

16 Claims, 22 Drawing Sheets

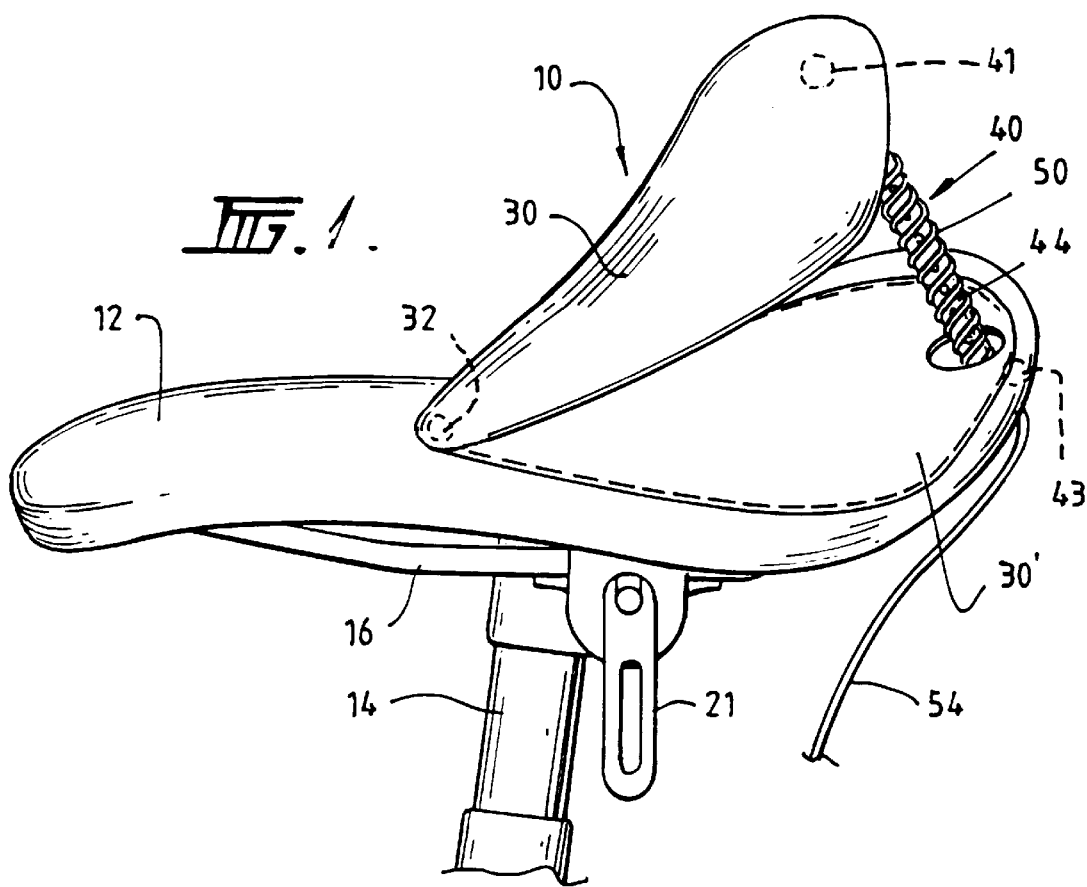
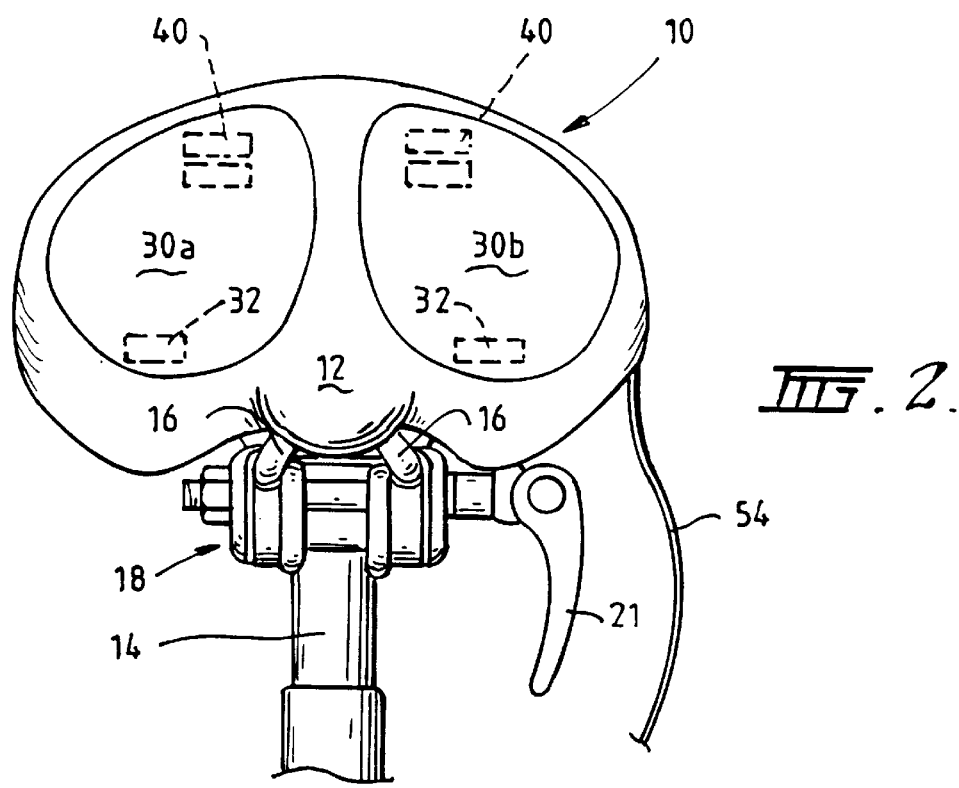

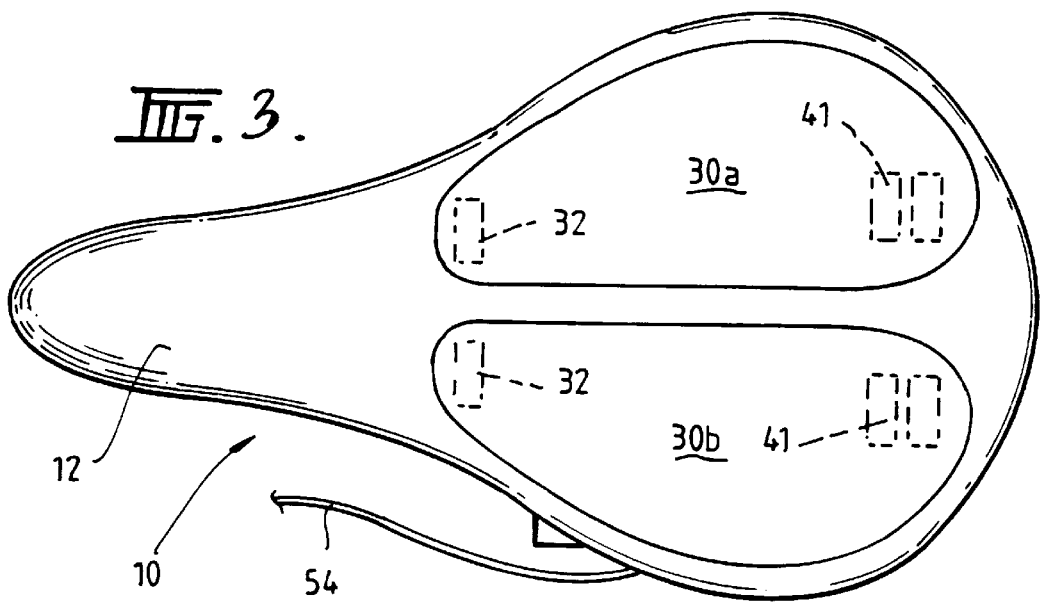
FIG. 3.
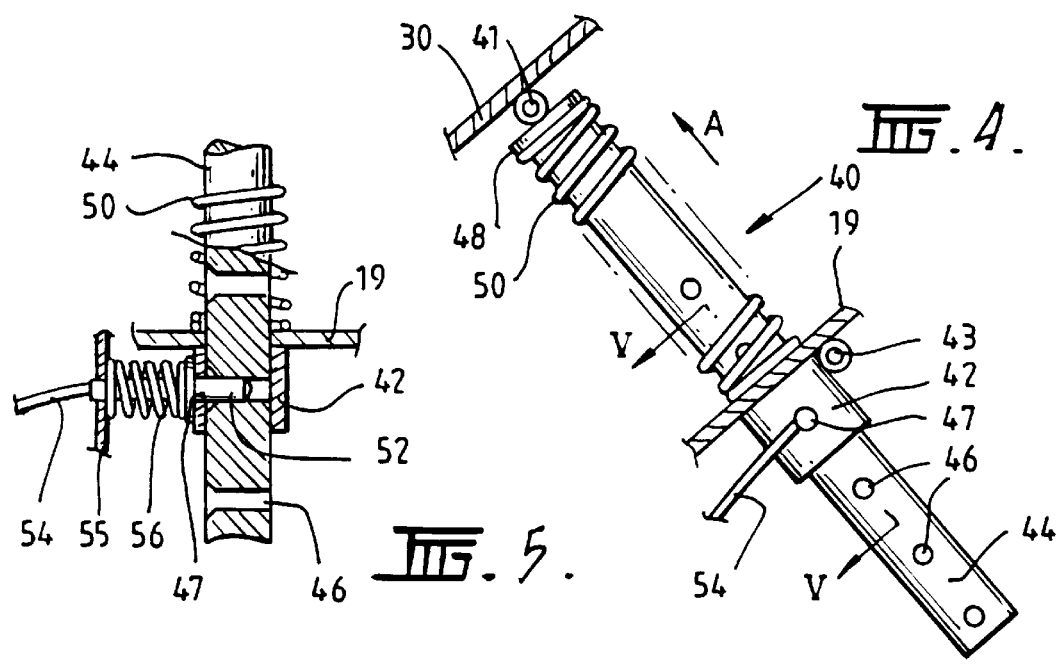
FIG. 4.
FIG. 5.
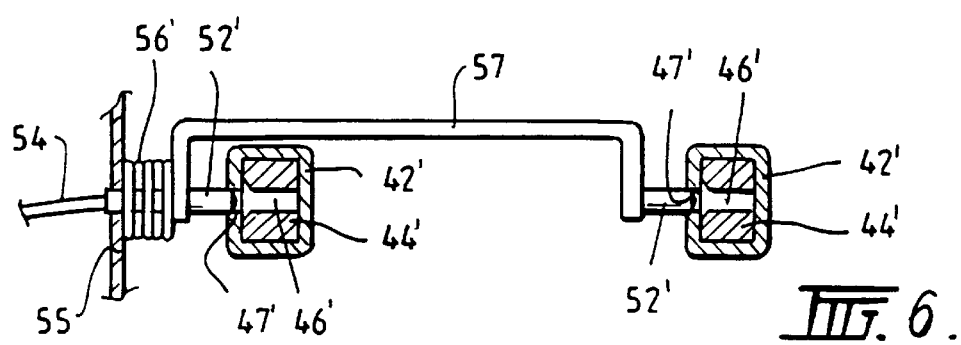
FIG. 6.

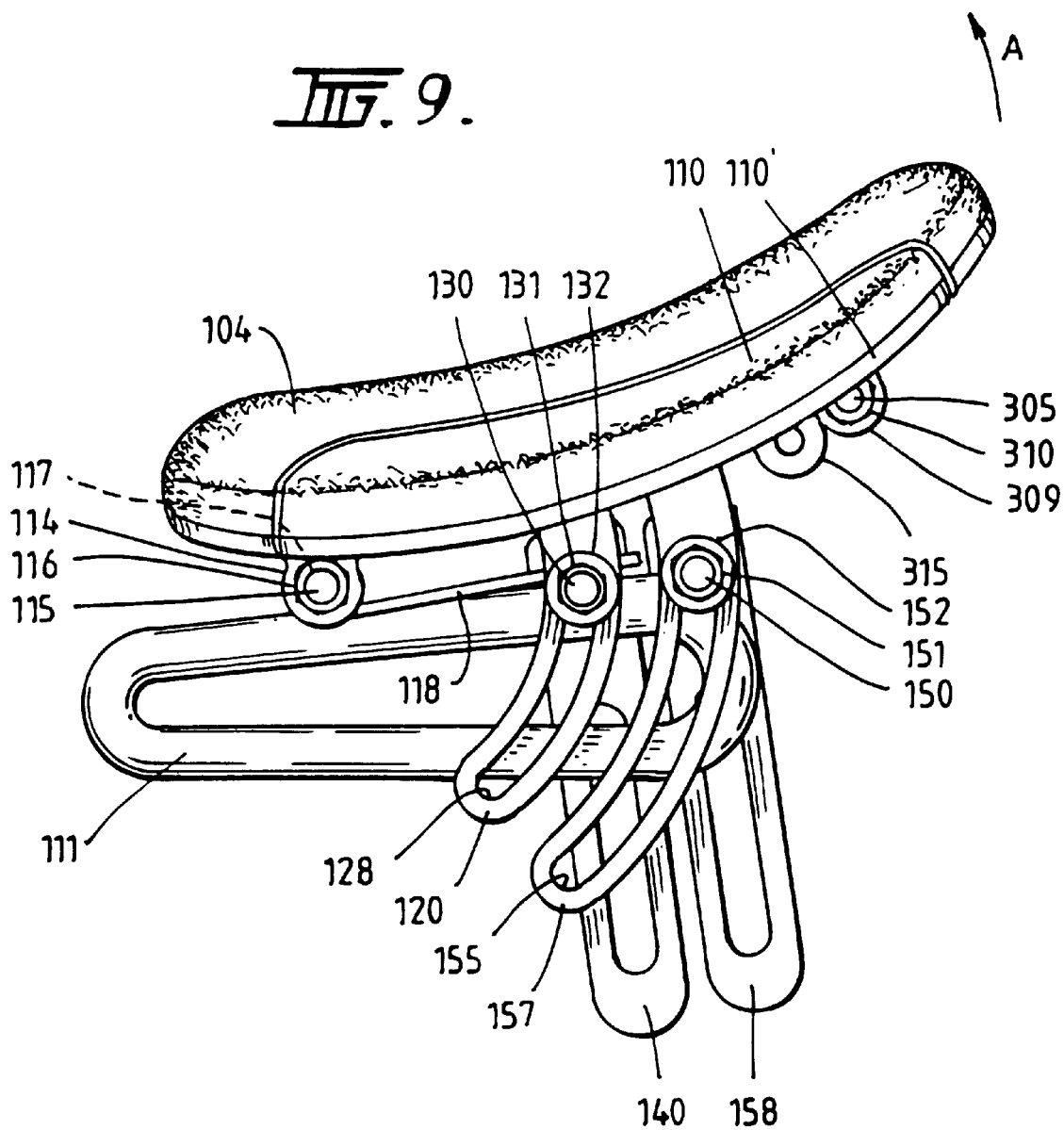

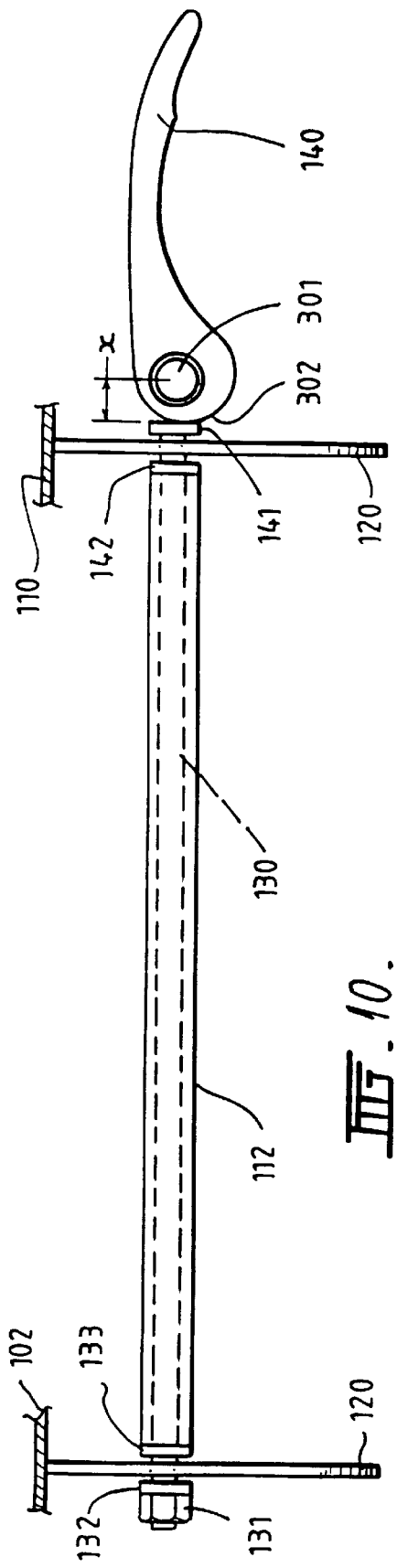
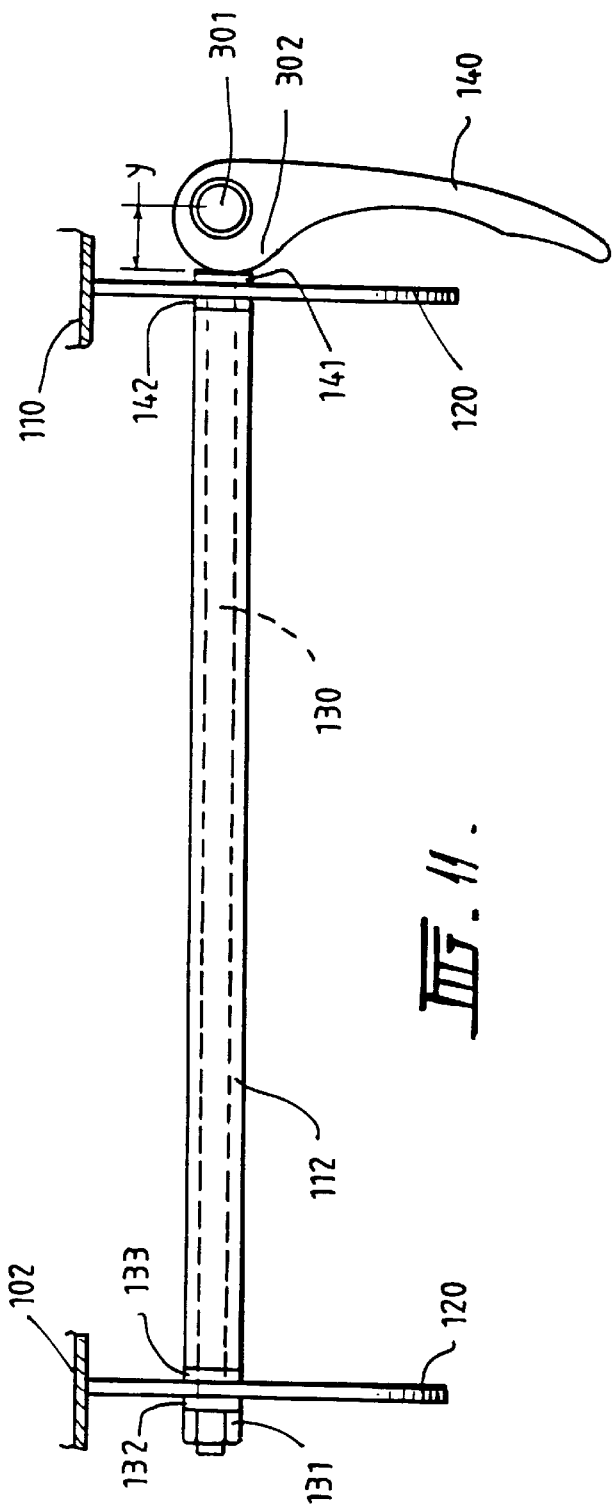

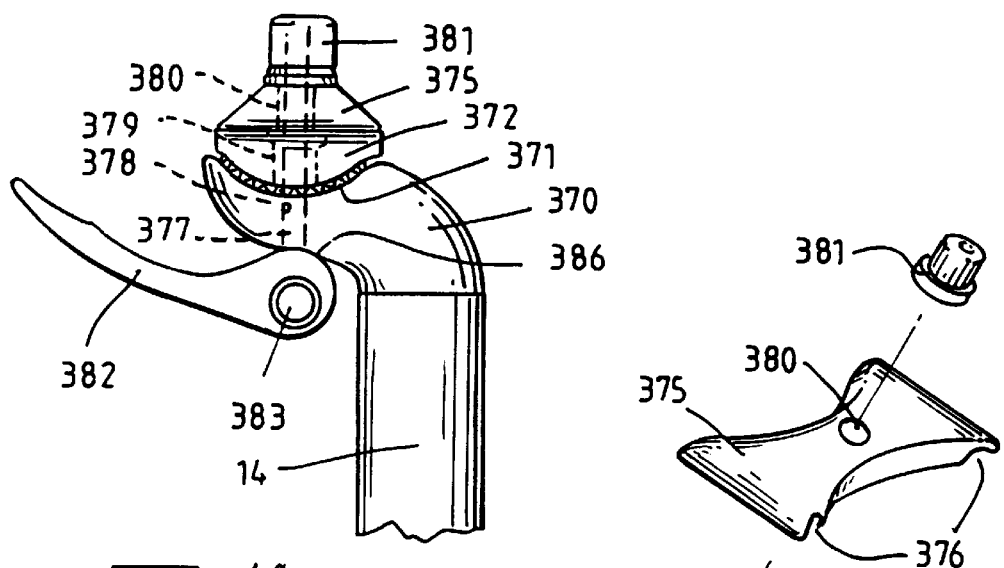
FIG. 14.
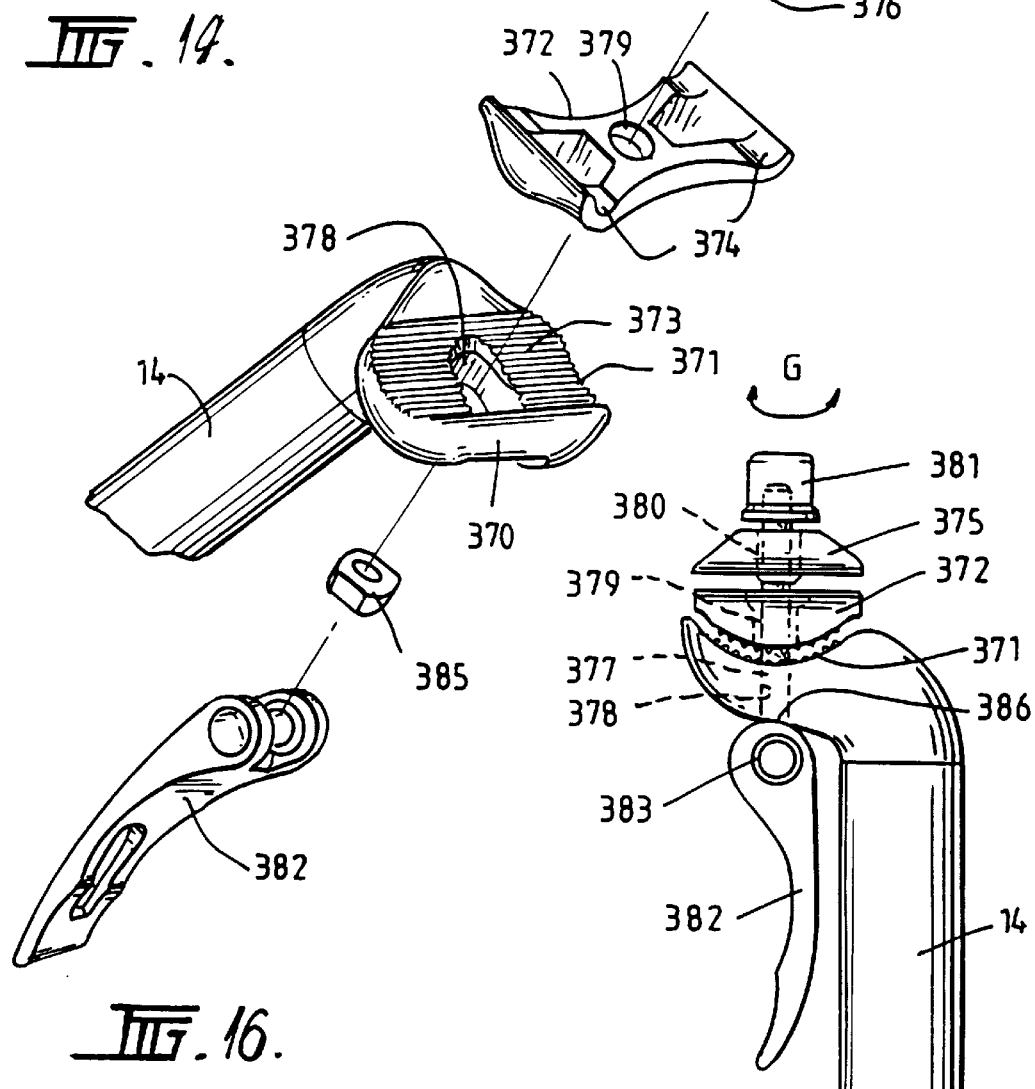
FIG. 16.
FIG. 15.

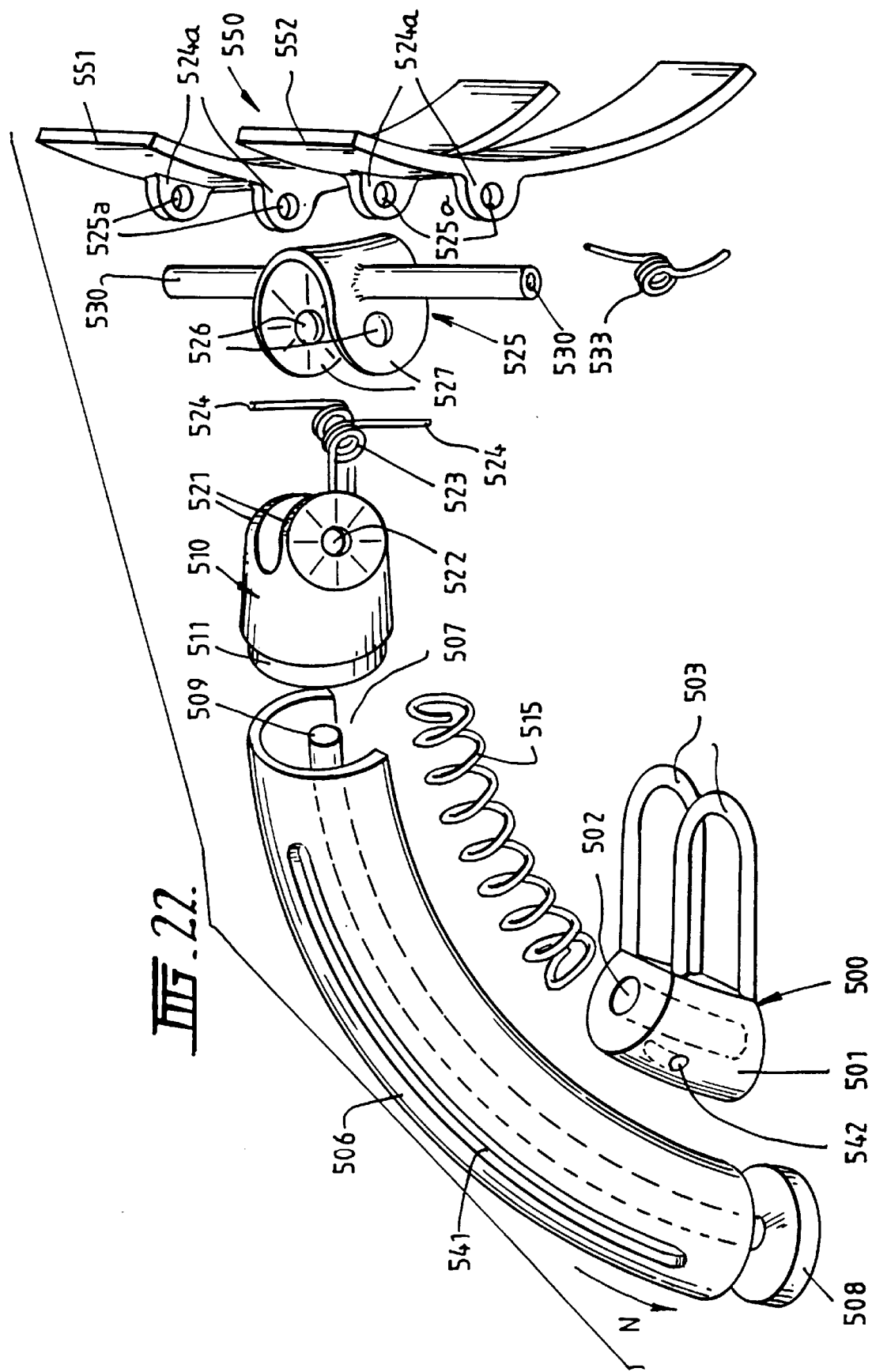

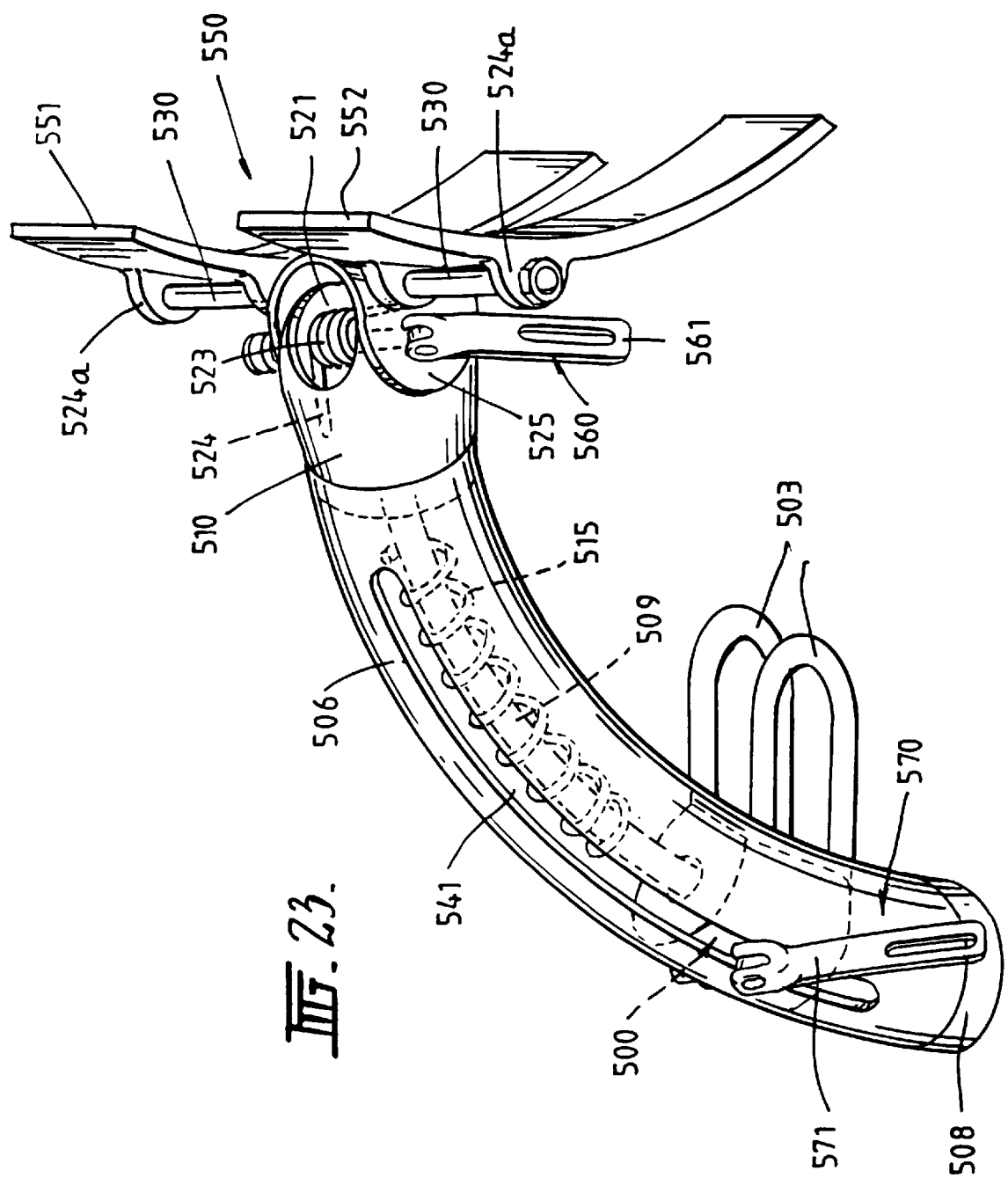

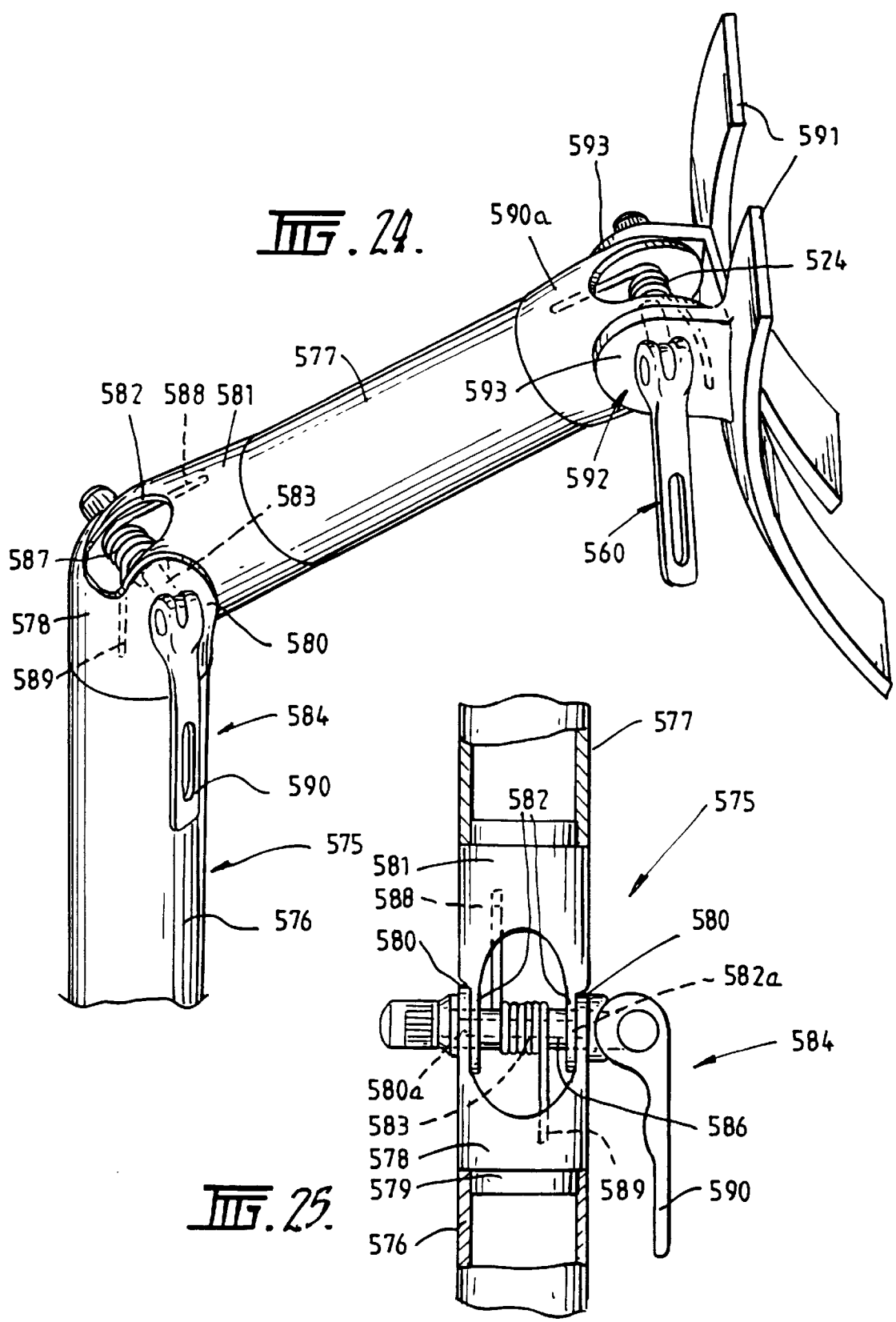

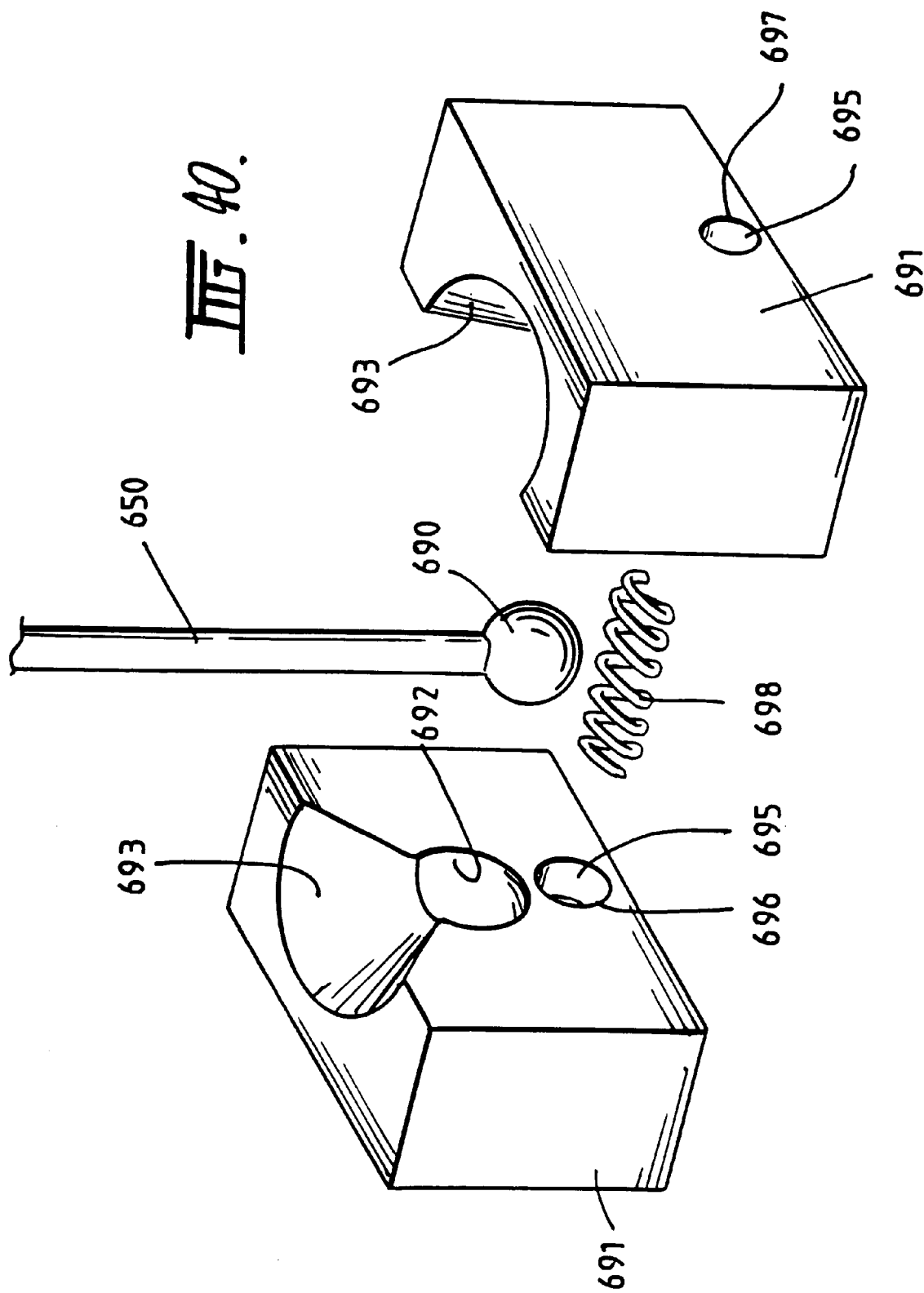

SEAT WITH AN ADJUSTABLE ABUTMENT PORTION

This invention relates to a seat and, in one aspect of the invention, to a seat which comprises an improvement to the seat disclosed in my earlier patent application PCT/AU94/00284. The contents of earlier International Patent Application No. PCT/AU94/00284 are incorporated into this specification by this reference.

My earlier international application referred to above discloses a seat which has particular application to bicycles and, in particular, to a seat for high performance bicycle riding such as bicycle racing. The seat disclosed in my earlier application basically comprises an abutment portion intended for receiving a portion of a person's seating anatomy which covers one or both of the person's ischial bones or at lest a part thereof, the abutment portion being dimensioned so that the majority of the seating compression to the person's seating anatomy occurs between the ischial bones and said abutment portion and so that substantially all the muscle and/or soft tissue surrounding said portion of the person's seating anatomy is not compressed or squeezed when the person is on the seat; and support means for supporting the abutment portion so that the abutment portion is transverse with respect to the horizontal so that without other support, it is not possible to permanently sit on the abutment portion with the backbone of the rider arranged generally vertically. Thus, my earlier seat can place the rider in a position where maximum efficient pedal power can be delivered when supporting primarily the rider's anatomy adjacent the strong ischial bone points so that unnecessary soft tissue is not squeezed and therefore fatigue and pressure soreness is reduced or eliminated.

The object of the first aspect of this invention is to provide a seat which can be used by high performance riders as discussed in my earlier international application but which also can be used by riders who desire more relative comfort or stability and have less emphasis on high performance riding. The seat can also be used in other environments such as rowing or the like.

This aspect of the invention may be said to reside in a seat including:
  a seat surface portion for receiving at least a portion of a person's buttocks;
  an abutment portion within the seat surface portion and forming part of the seat surface portion; and
  adjustment means for adjusting the abutment portion out of the seat surface portion so that in a first position of the seat, a user can seat on the seat surface and by adjustment of the adjusting means, the seat can be placed into a second position where the user seats against the abutment portion.

Thus, the seat can be placed in the first position where a user seats on the seat surface for comfort where performance criteria is not of importance and if the user wishes to place the seat in a position where the user will be seated in a high performance orientation, the adjustment means can be adjusted to thereby move the abutment portion out of the seat portion so that the user seats against the abutment portion rather than the entire seat surface.

Preferably the abutment portion is substantially co-planar with the remainder of the seat surface and the abutment portion and the remainder of the seat portion form the entire seat surface for receiving at least a portion of a person's buttocks and, in the second position upon actuation of the adjustment means, the abutment portion is moved out of the plane of the remainder of the seat surface into the second position so that a user can seat only against the abutment portion rather than the entire seat surface.

Preferably the abutment portion is for receiving a portion of a person's seating anatomy which coves one or both of the person's ischial bones or at least a part thereof, the abutment portion being dimensioned so that the majority of the seating compression to the person's seating anatomy occurs between the ischial bones and said abutment portion and so substantially all the muscle and/or soft tissue surrounding said portion of the seating anatomy is not compressed or squeezed when the person is on the abutment portion.

Preferably the adjustment means can adjust the abutment portion from a position where the seat surface can take 100% of a rider's weight and the rider can be seated permanently on the seat surface and a position where the abutment portion is inclined and the abutment portion takes substantially none of the rider's weight but provides an abutment for a portion of the person's anatomy. Preferably the adjustment means provides for intermediate adjustment between the first and second positions so that the user can be located on the abutment portion with varying amounts of the user's weight supported by the abutment portions.

In one embodiment the abutment portion is pivotally coupled to the seat for movement from a position generally planar with the remainder of the seat surface to the second position, and wherein the adjusting means comprises a first member, a second member, the first and second members being moveable with respect to one another, a spring for biasing the first member and the abutment portion relative to the second member towards the second position.

Preferably locking means is included for locking the first and second members together to secure the abutment portion in the first or second positions or in a position between the first and second position.

In this embodiment the locking member comprises a pin locatable in any one of a plurality of aligned holes in the first and second members and a cable coupled to the pin for selectively removing the pin from one of the aligned holes to enable the spring to bias the abutment portion towards the second position and to relocate the pin in another of the aligned holes to secure the abutment portion in a required position.

In another embodiment of the invention, the abutment portion comprises a plurality of seat portions pivotally moveable out of the seat surface portion and biasing means for biasing the seat portions out of the seat surface portion, and wherein the adjustment means comprises a compression lock for locking the seat portions in a desired position at the first position, the second position or a position between the first and second positions.

In this embodiment of the invention, the seat surface portion also includes third and fourth seat portions which are also pivotally mounted for movement out of the seat surface portion and wherein second biasing means is provided for biasing the third and fourth seat portions.

Preferably a second compression lock is provided for locking the third and fourth seat portions in the first position, the second position or a position between the first and second positions. Thus, in this embodiment of the invention, the abutment portion made up of the first and second seat portions can move out of the seat surface portion alone or the abutment portion made up of the first and second seat portions can move together with the third and fourth seat portions or the third and fourth seat portions could move alone or any one of the first to fourth seat portions can move independently of the other seat portions.

A further aspect of the invention may be said to reside in a seat, including:

a seat member; and an arcuate shaped guide member coupled to the seat member for guiding movement of the seat member along an arcuate path.

Preferably the movement is between a lower rearward position and an upper forward position; and locking means for releasably locking the seat member in a desired position at the lower rearward position, the upper forward position or a position therebetween.

Preferably the guide member comprises an arcuate sleeve and an arcuate rod moveable in the sleeve, the rod being coupled to the seat member.

Preferably the mechanism includes a spring for biasing the rod relative to the sleeve to thereby bias the seat along the arcuate path.

Preferably the locking means comprises a hole in the sleeve and a plurality of holes in the rod, and a pin for location through the hole in the sleeve and into one of the holes in the rod to thereby lock the rod relative to the sleeve and position the seat in the desired position.

Preferably a cable is coupled to the pin for controlling movement of the pin into and out of the holes in the rod to allow movement of the rod or to lock the rod to the sleeve.

Preferably the mechanism includes pivotal coupling means for coupling the seat to the mechanism, and biasing means for biasing the seat into a certain position relative to the mechanism.

A further aspect of the invention may be said to reside in, a mounting post for a seat, including:

a plurality of post segments;

pivotal coupling means arranged between adjacent segments for enabling the adjacent segments to pivot relative to one another; and biasing means for biasing the adjacent segments toward a certain position.

Preferably the mounting post includes releasable locking means for locking the segments relative to one another.

Preferably pivotal coupling means comprises opposed projections on the adjacent segments, the projections having an aligned opening for receiving a shaft about which one of the segments can pivot relative to another of the segments.

Preferably the locking means is a clamp lock, and the shaft comprises the shaft of the clamp lock.

Preferably the biasing means is at least one torsion spring.

Preferably the shaft of the compression lock passes through the coiled section of the torsion spring.

The invention may also be said to reside in a seat, including:

a seat member;

biasing means for biasing the seat member so that the seat member can float under the influence of the biasing means; and wherein a user can sit on the seat member and push the seat member against the bias of the biasing member.

Thus, according to this aspect of the invention, a rider simply leans back against the seat to push the seat backwards into a position where the rider can comfortably pedal the bicycle. The biasing means provides a resistance to push the seat against the rider so that there is a reaction to enable the rider to easily pedal the bicycle. As the rider moves forward, for example, into a power position to deliver more power to the pedals, the seat will follow the rider so the rider basically maintains a seated position notwithstanding the fact that the rider is in a different position and delivering more power.

Depending on activity, the degree of movement is relatively important for comfort and ergonomic efficiency. For example, a bicycle seat having a range of movement from −10° to 90° is preferred for comfort and energy return.

In one embodiment of the invention, the biasing means is arranged to bias the seat forward in a straight line which is substantially horizontal.

However, in another embodiment of the invention, the biasing means biases the seat member along an arcuate path from a lower rear position to a higher front position. In this embodiment of the invention, the arcuate path could be provided by an arcuate guide member.

Preferably the biasing means comprises a spring.

In one embodiment of this aspect of the invention locking means may be provided to lock the seat member and prevent floating movement of the seat under the influence of the biasing means.

In a further aspect, the invention may be said to reside in a seat mounting mechanism for mounting a seat, including:

a support member for coupling to an article;

at least one first guide member coupled to the support member for movement in a generally horizontal direction relative to the support member; and at least one second guide member coupled to the at least one first guide member for movement in a generally vertical direction relative to the at least one first guide member.

Preferably the seat mounting includes locking means for locking the guide member relative to the support member.

Preferably the locking means is also for locking the seat coupling relative to the guide member.

Preferably either the first or second guide member includes a substantially horizontal section.

Preferably the other of the first or second guides includes a generally vertically arranged arcuate section.

Preferably a generally vertically arranged straight section is coupled to either the first or second guide member.

Preferably the guide member comprises a pair of slotted rails arranged in channels on the support member for movement in the channels and the seat coupling comprises a pair of slotted rails which are arcuate in shape and which are coupled at ends of the rails which form the guide member.

Preferably the locking means comprises a compression lock for locking the slotted rails which form the guide member to the support member and a second compression lock for locking the rails that form the seat coupling to the rails which form the guide member.

In one arrangement biasing means is provided between the support member and the guide member for biasing the guide member to a forwardmost position, and second biasing means is provided between the guide member and the seat coupling for biasing the seat coupling to a certain position relative to the guide member.

A still further aspect of the invention may be said to reside in a seat mounting and adjusting mechanism, including:

a seat portion;

an abutment member for movement relative to the seat portion for engaging the seat portion and for moving the seat portion to move upwardly or downwardly relative to the abutment portion.

A further aspect of the invention provides a seat mounting for a seat which has at least one mounting member coupled to the seat, said seat mounting including:

a first clamp member and a second clamp member for engaging said mounting member and selectively clamping said mounting member to fix the mounting member and releasing the mounting member, the first and second clamping members and aligned holes;

a shaft for passing through said aligned holes; and a cam lever coupled to said shaft for pivotal movement between an open position and a closed position, the cam lever having a cam surface, wherein in the closed position, the cam surface of the cam applied tension to the first and second clamp members for clamping the mounting member and locking the seat in position, and when the cam lever is pivoted to the open position, the cam surface is moved relative to the first and second clamp members to release tension for releasing the first and second clamp members from the mounting member to enable the mounting member and therefore the seat to be moved relative to the seat mounting.

Preferably mounting means includes third and fourth clamping members and the mounting member comprises a pair of rails, the first and second clamping members engaging one of the pair of rails and the third and fourth clamping members engaging the second of the pair of rails, the third and fourth clamping members having aligned holes which are aligned with the holes of the first and second clamp members;

a seat post bracket having a pair of lugs including aligned holes for location between the first and second clamp members and the third and fourth clamp members, the seat post bracket having a curved bracket portion for engaging a mounting post; and wherein when the cam lever is in the closed position, the seat post bracket has a tension applied to it for clamping the bracket to the bicycle post and when the cam lever is in the open position, the tension is released to enable the seat post bracket to move relative to the seat post for adjustment of the bicycle seat.

Preferably a stop is located at the end of the shaft for providing a reaction for the first, second, third and fourth clamp members and the seat post bracket.

Preferably a moveable reaction is provided on the shaft for engagement by the cam surface for selectively applying tension and releasing tension from the clamp members and the seat post bracket.

Preferably the moveable reaction members comprise a spacer sleeve.

In another embodiment, the attachment means comprises a post having a curved surface portion, a hole passing through the curved surface portion, the second clamp member having a curved surface portion for engaging the curved surface portion and the hole in the curved surface portion being aligned with the holes in the first and second clamp members, said shaft passing through the hole in the curved surface member and the hole in the first and second clamp members.

In this embodiment, the mounting member also comprises a pair of rails for engagement by the first and second clamp members.

In the first embodiment of this aspect of the invention, the shaft and the cam lever are arranged generally horizontally whereas in the second embodiment, the shaft and the cam lever are arranged generally vertically.

The invention may also be said to reside in a seat, including:

a seat member formed from spring material so that the seat member is able to flex and/or move and/or generally conform to a user's anatomy when the user sits on the seat member.

In one embodiment of this aspect of the invention, the seat member comprises a single sheet of spring material.

However, in other embodiments, the seat member could comprise a plurality of sheets of spring material and coupling means for coupling the plurality of sheets together so that each sheet is able to move independently of the other sheets to conform to a user's anatomy and/or flex and/or move.

A further aspect of the invention is concerned more generally with support members such as seats which can not only be used in sporting environments such as cycling and rowing, but also seats for general use such as home use or specialist seats used for dentistry or in other medical environments together with other support members for supporting the human body including beds, pillows, medical supports or harnesses etc.

This aspect of the invention may be said to reside in a support member having:

a support portion for receiving at least part of a user's anatomy, the support portion being formed from a plurality of support elements; and biasing means for individually biasing the support elements towards a predetermined position so that when a user is supported on the support elements the support elements move against the bias of the biasing means to take up position depending upon a load placed upon the support elements and/or the contour of the user's anatomy.

Preferably the support member includes locking means for locking the support element in position.

In this embodiment of the invention the positions of the support elements are altered depending upon load and a user's contour to thereby contour the support to suit a person's anatomy. The elements may then be locked in position to suit an individual's needs.

Preferably the support elements can flex.

Preferred embodiments of the invention will be further described, by way of example, with reference to the accompanying drawings, in which:

FIG. 1 is a side view of a seat according to the first embodiment of the invention;

FIG. 2 is a front view of the seat of FIG. 1;

FIG. 3 is a front view of the seat of FIG. 1;

FIG. 4 is a view of an adjusting mechanism used in the embodiment of FIG. 1;

FIG. 5 is a cross-sectional view along the line V—V of FIG. 4;

Figure 7:
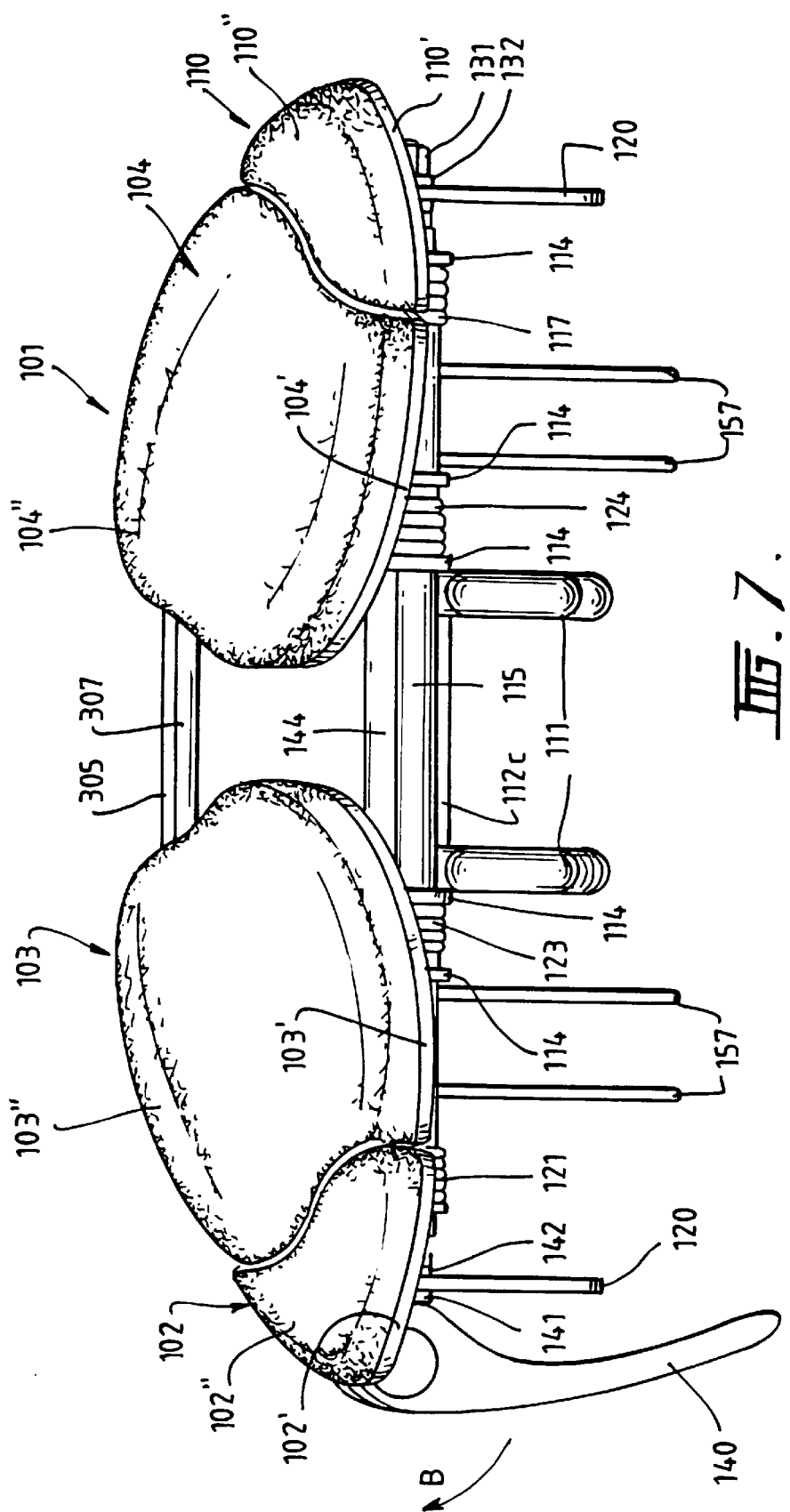
Figure 8:
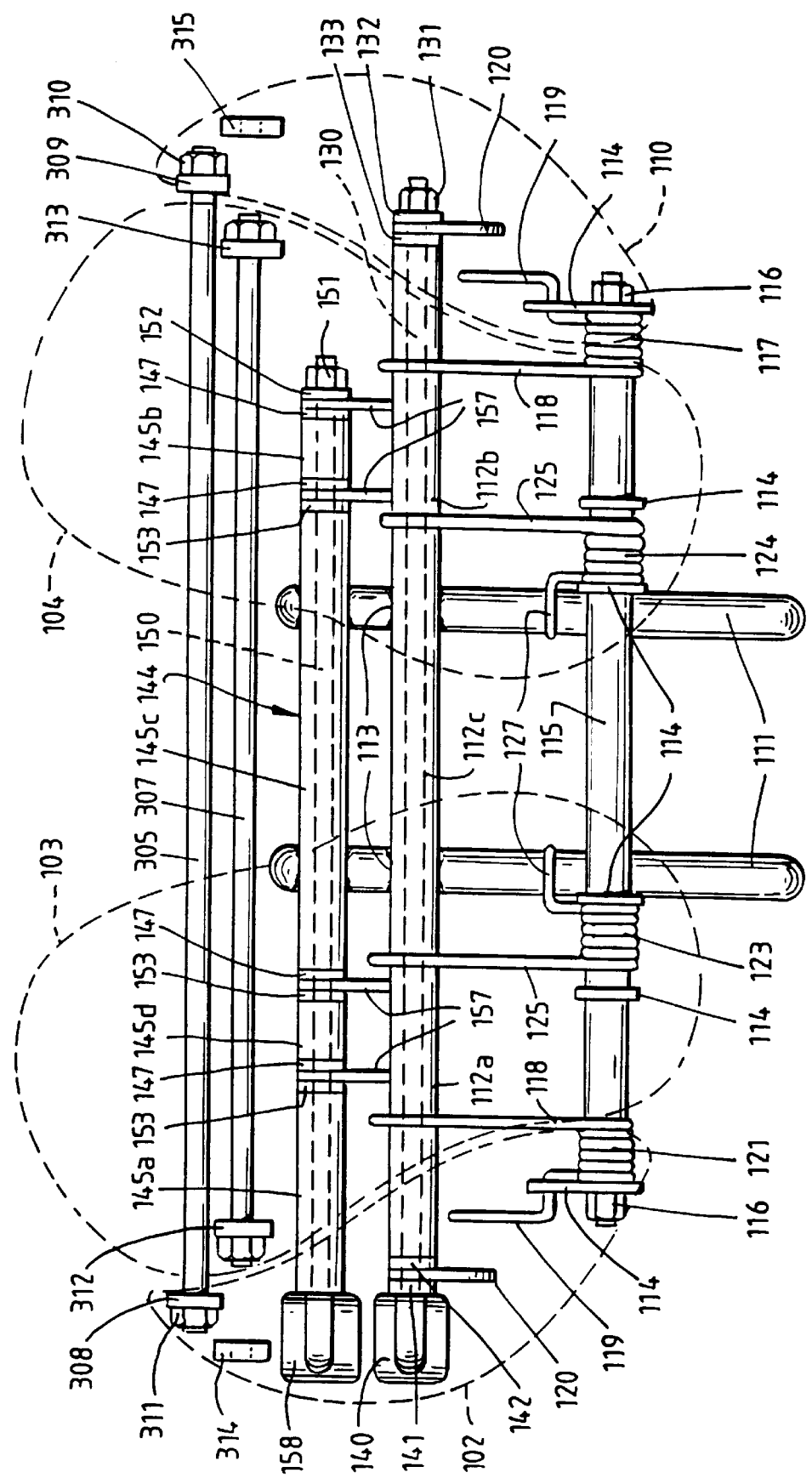
Figure 12:
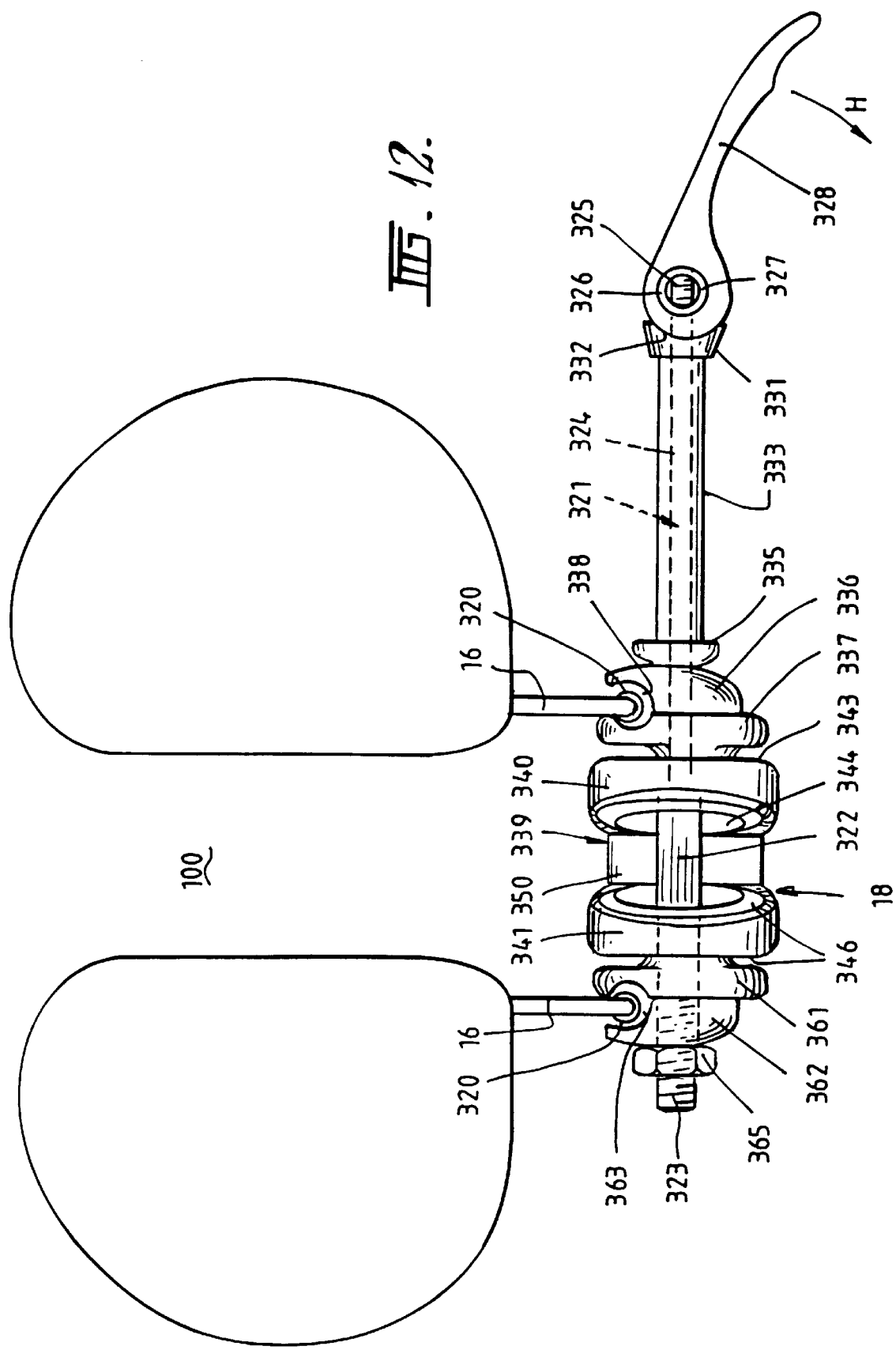
Figure 13:
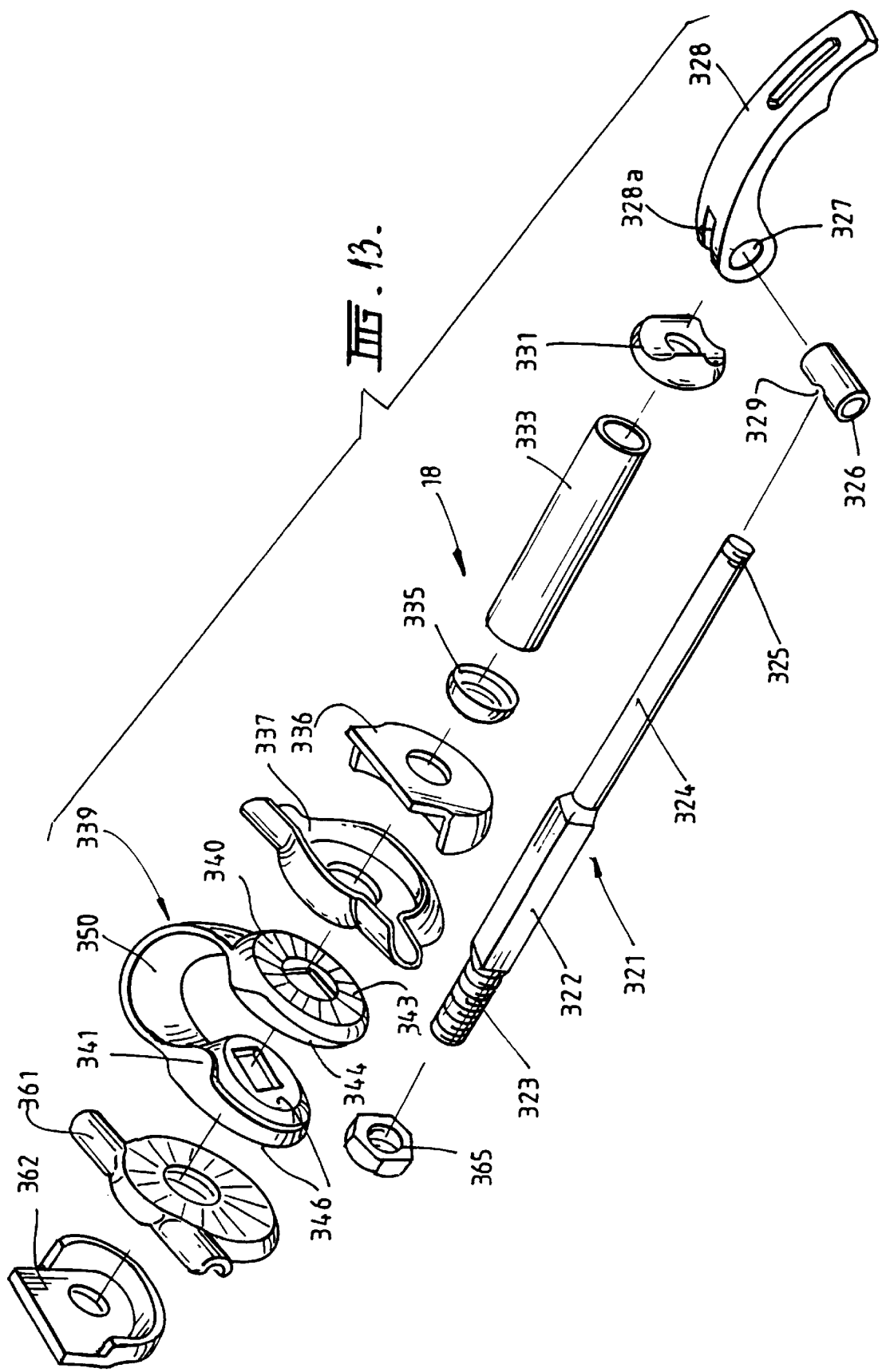
Figure 17:
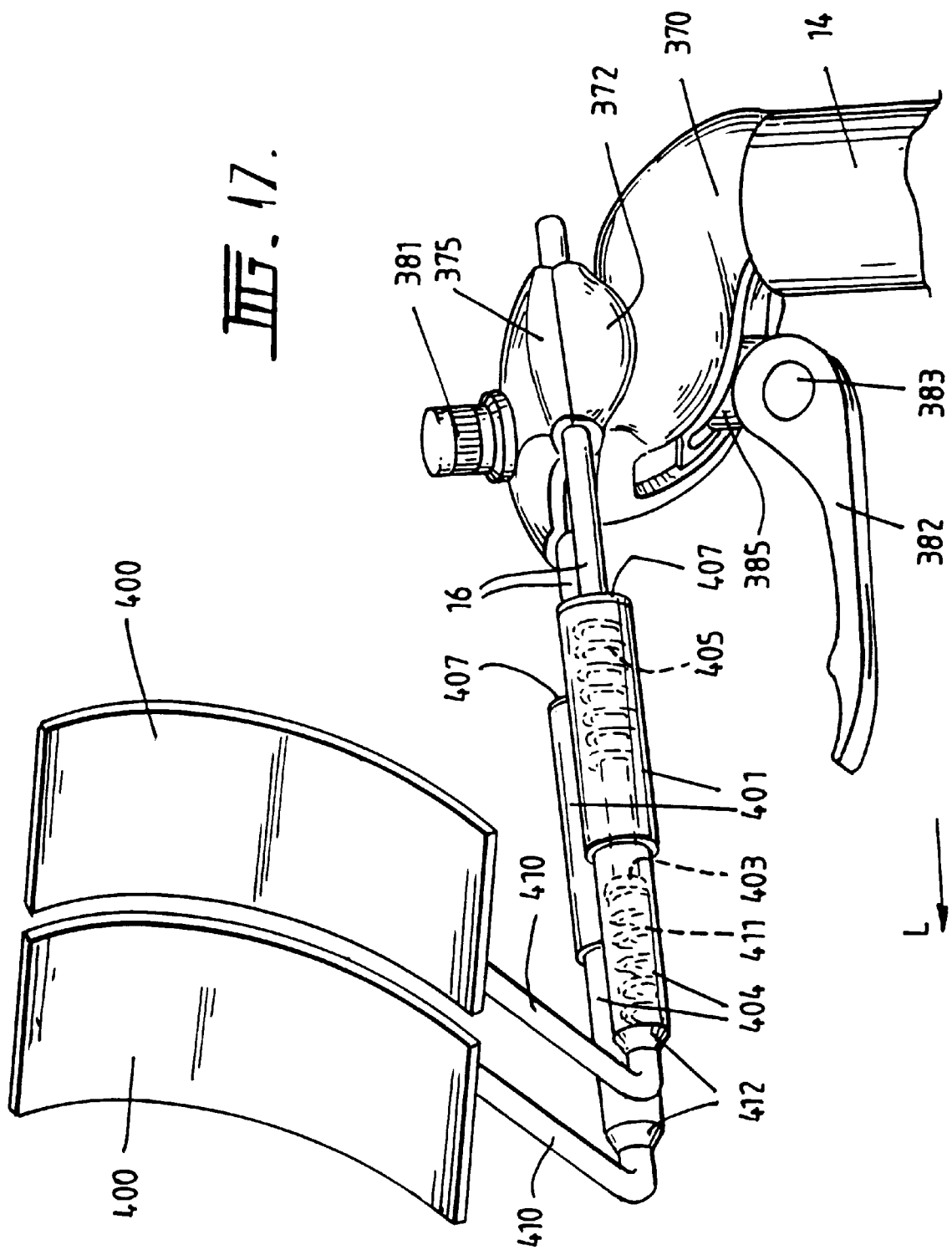
Figure 18:
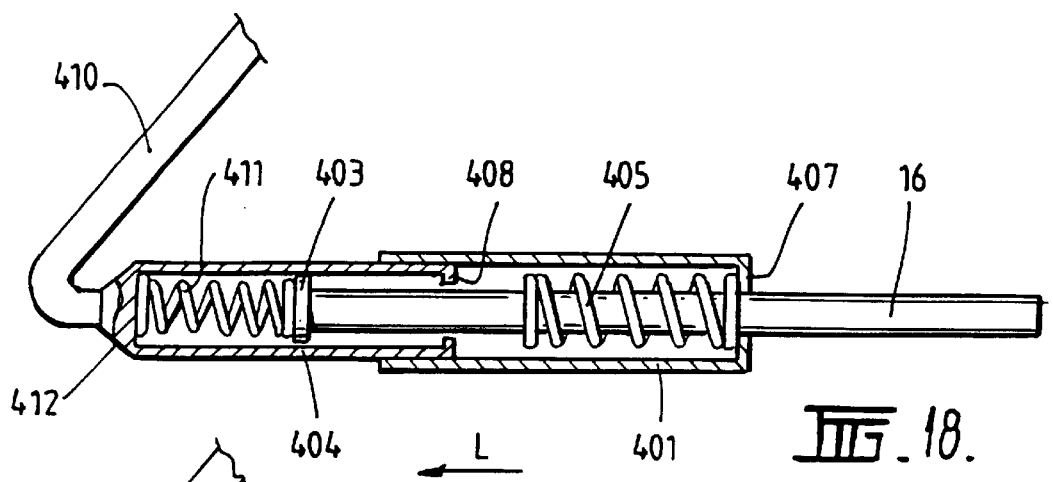
Figure 19:
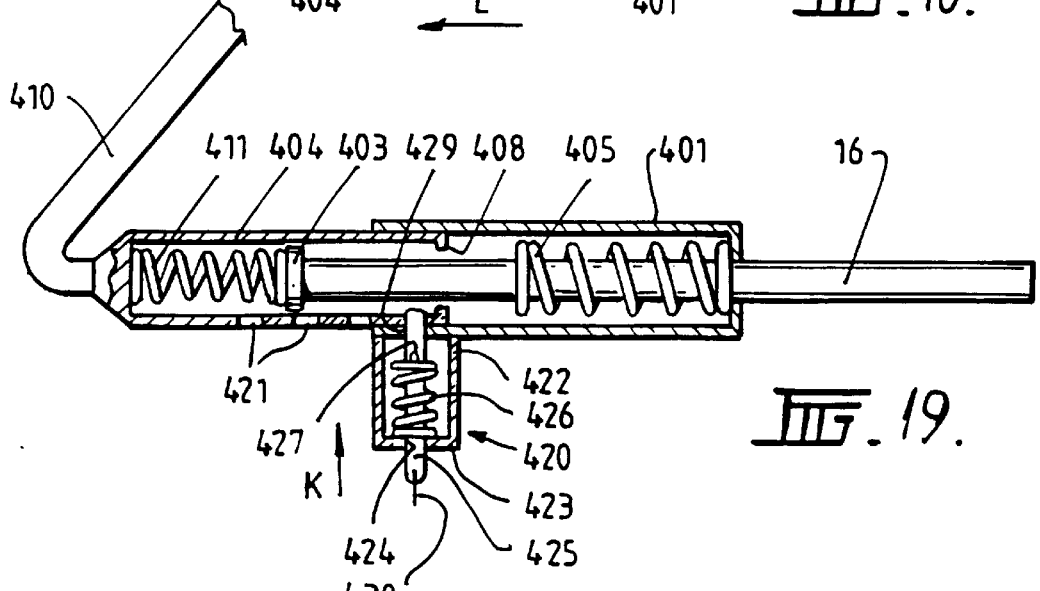
Figure 20:
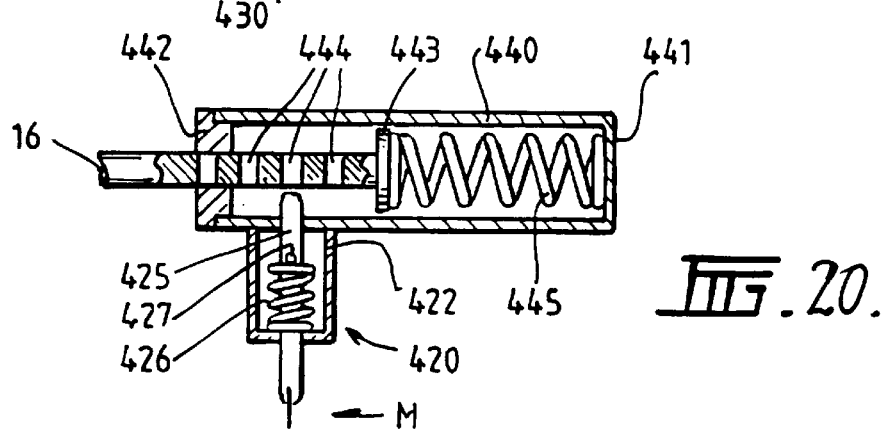
Figure 21:
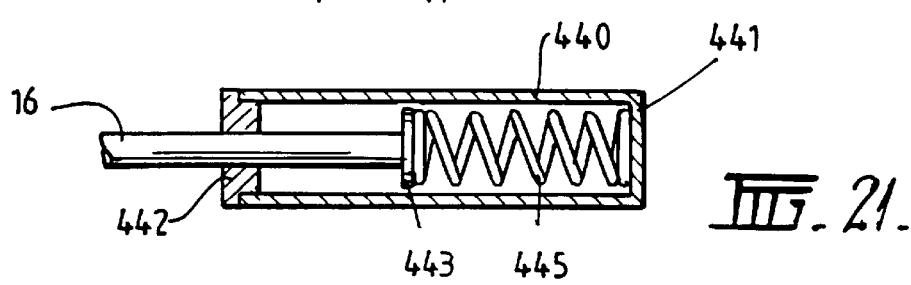
Figure 26:
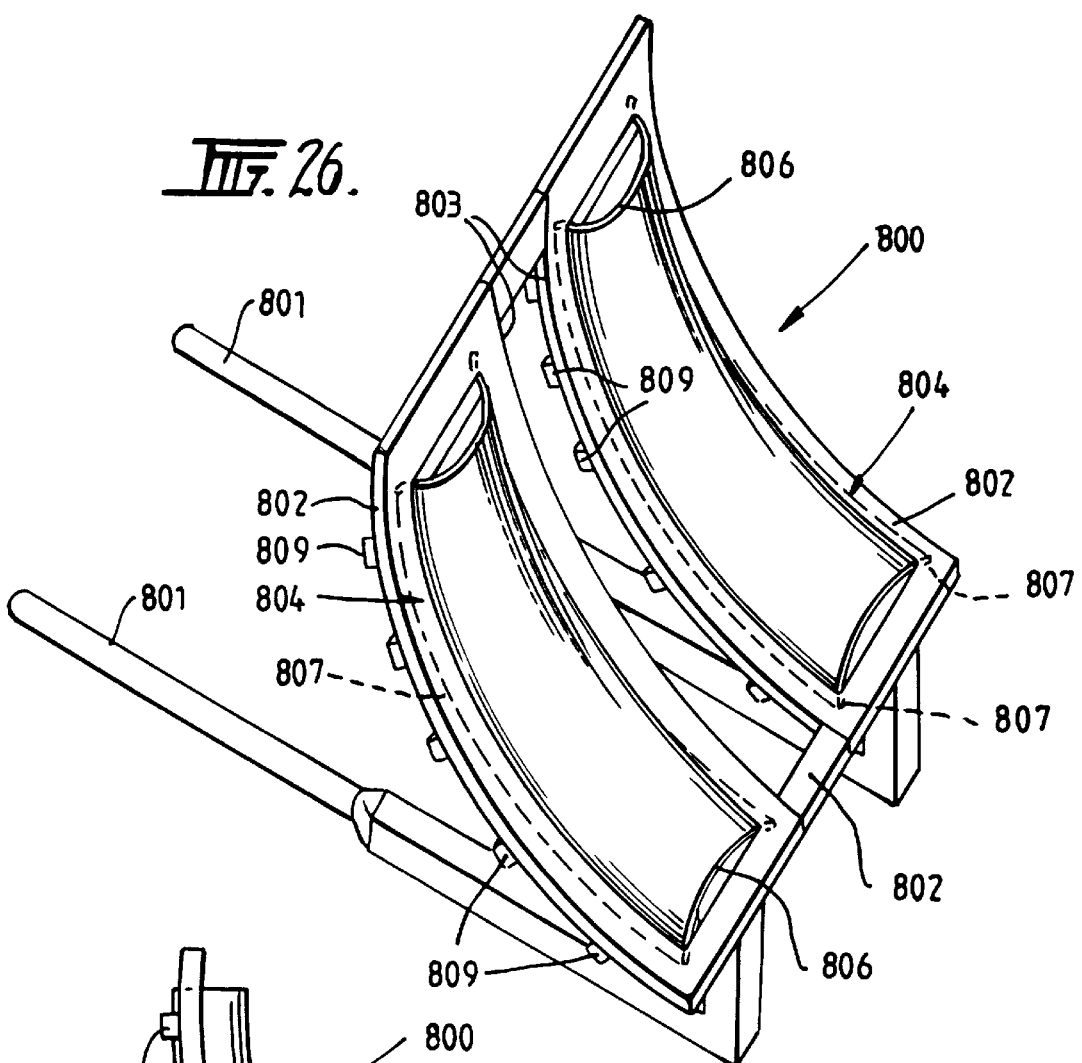
Figure 27:
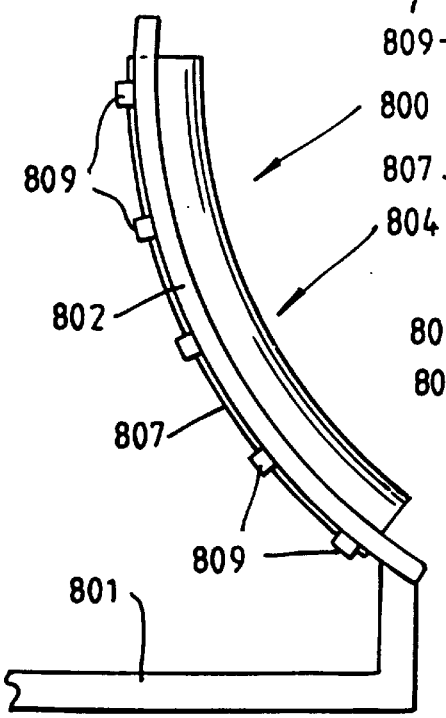
Figures 28, 29:
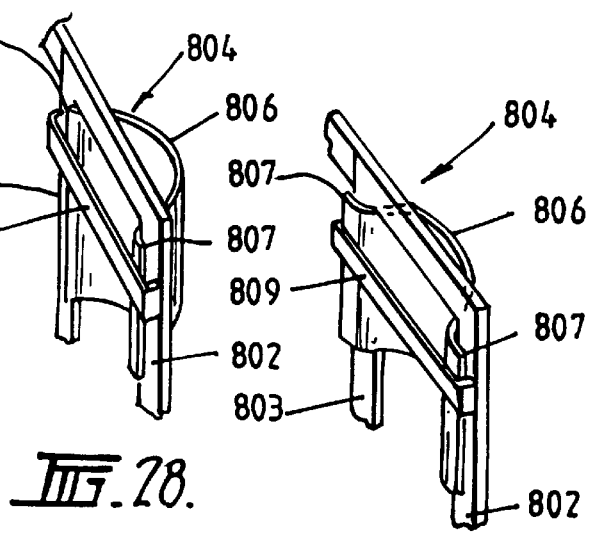
Figure 30:
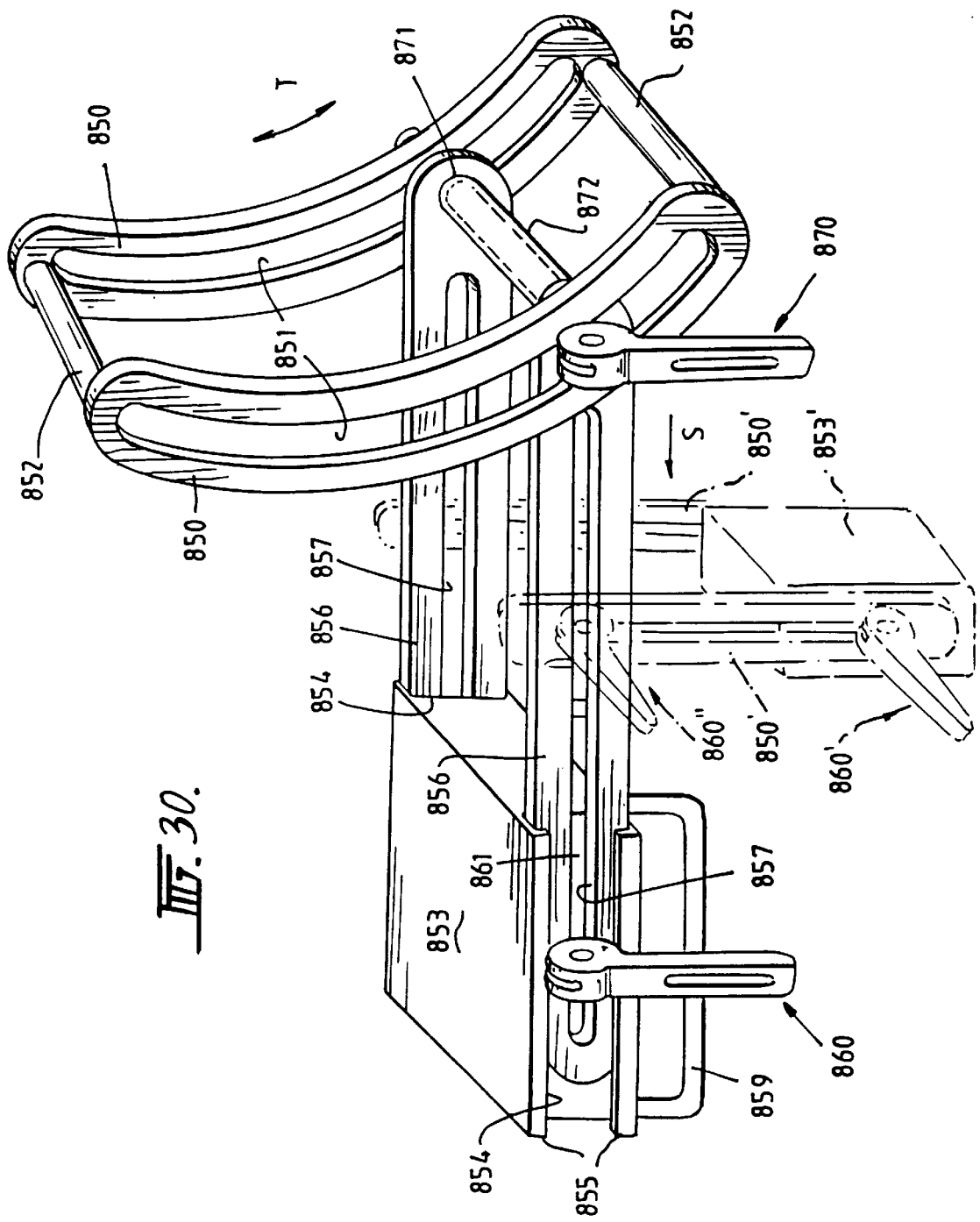
Figure 31:
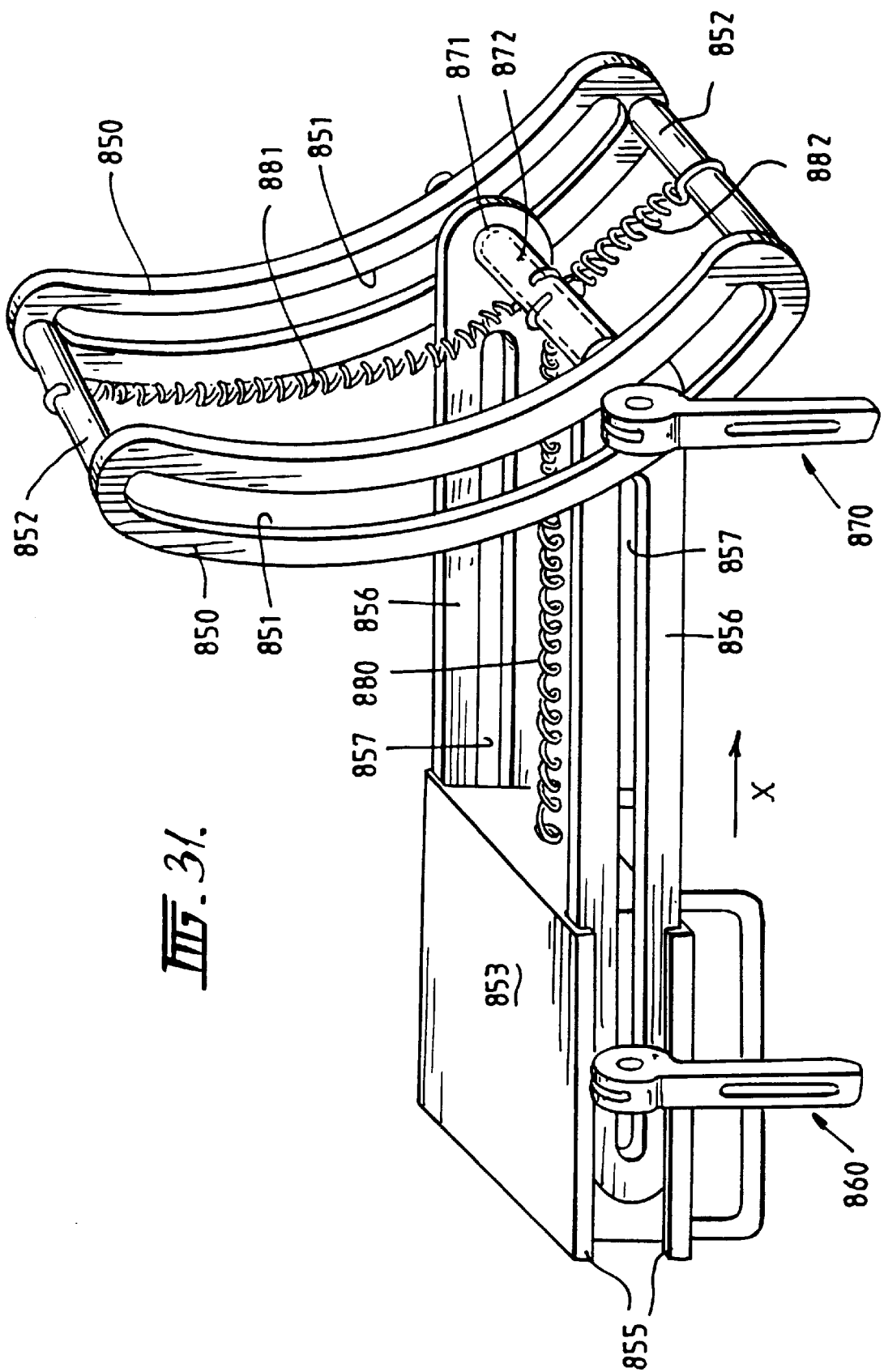
Figure 32:
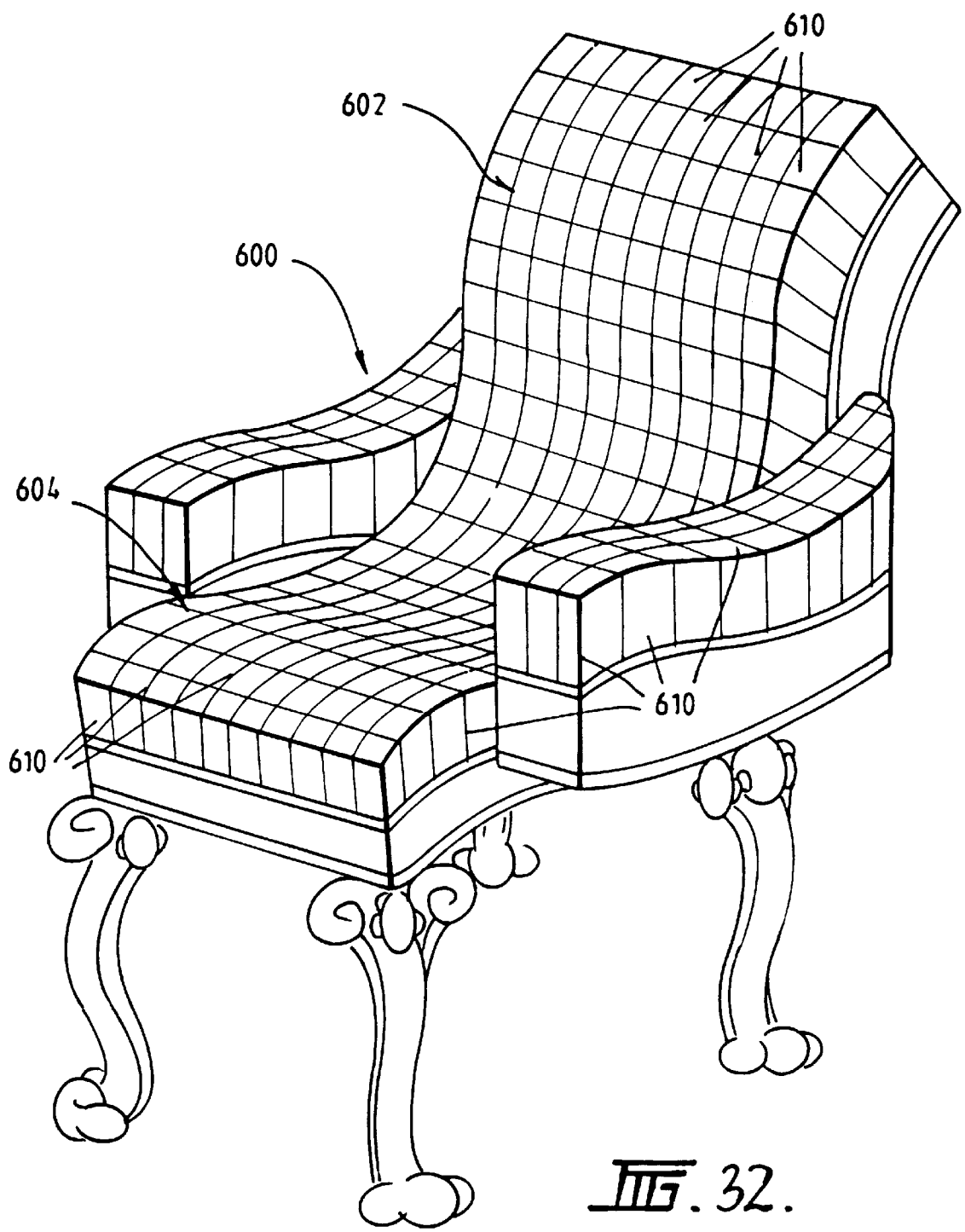
Figure 33:
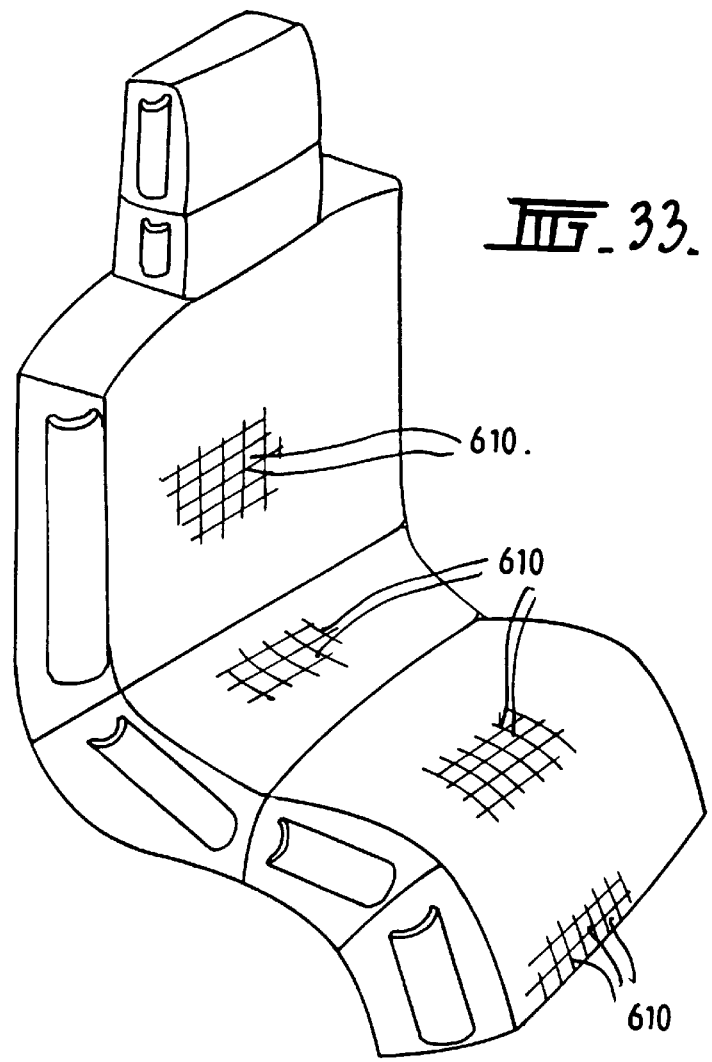
Figure 34:
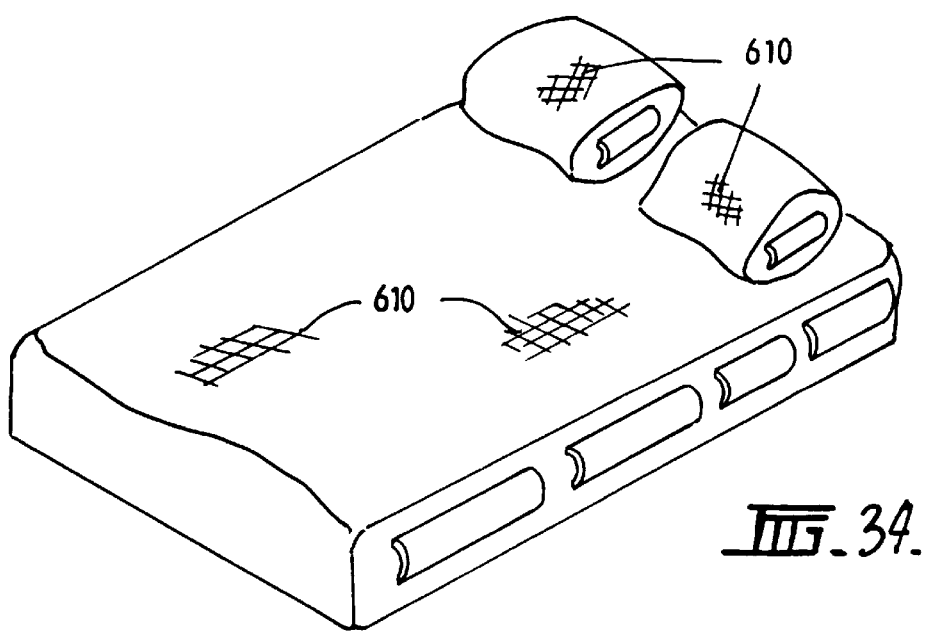
Figure 35:
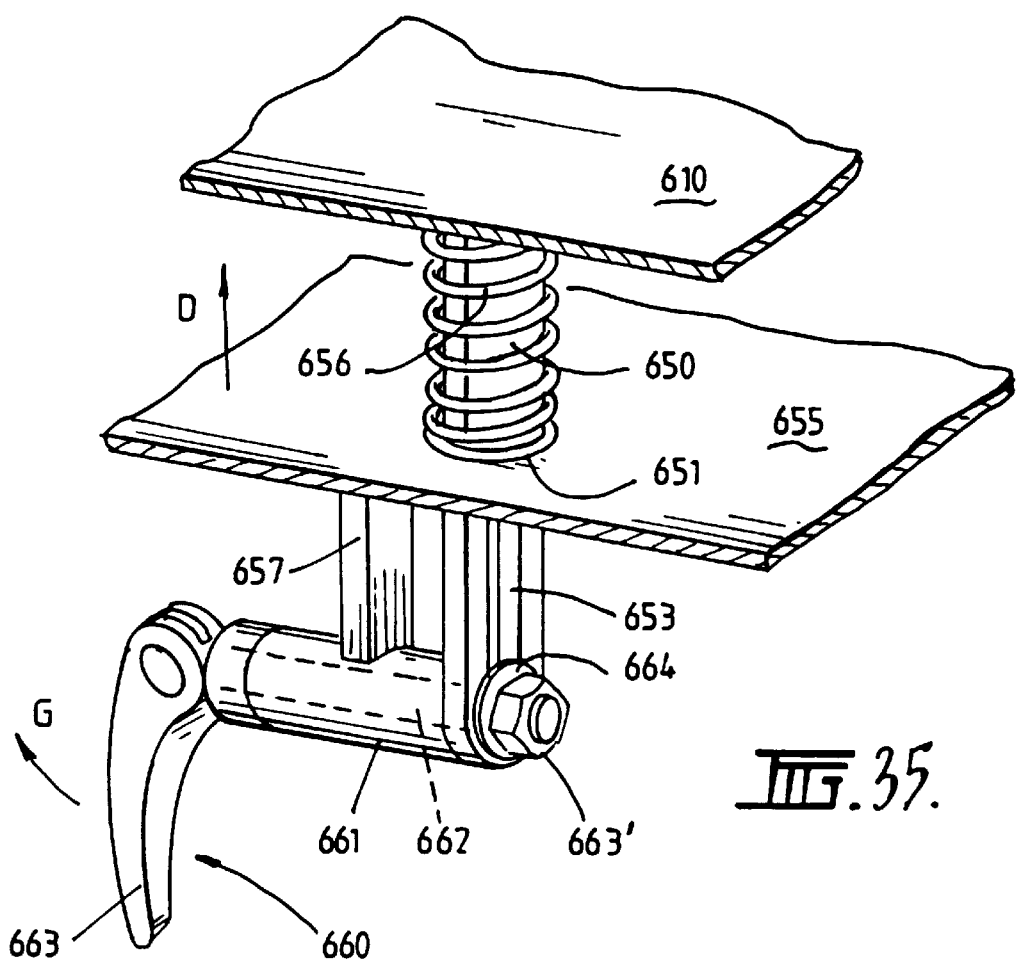
Figure 36:
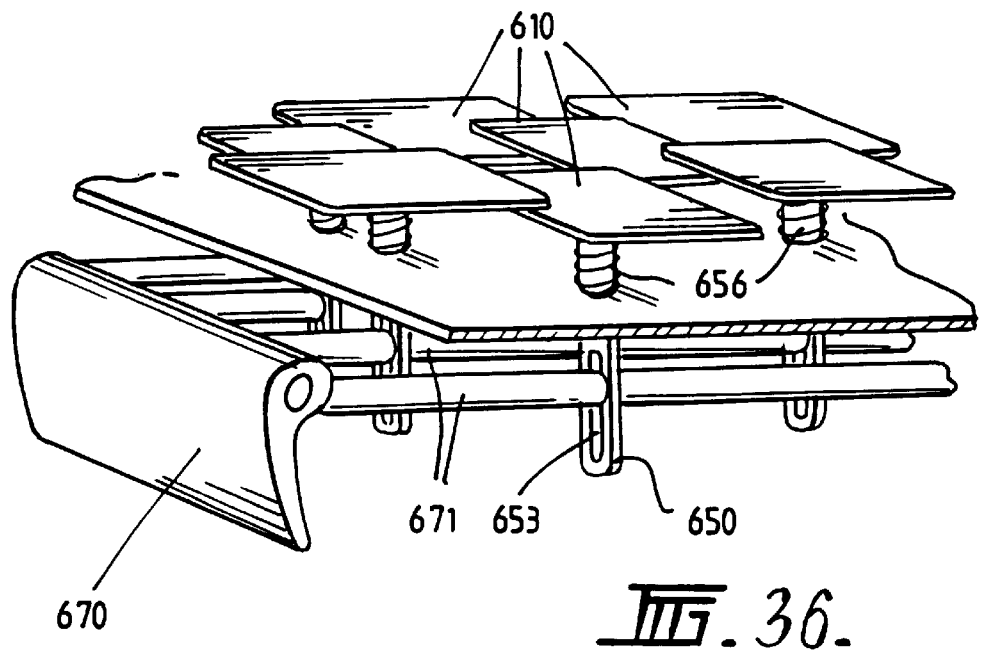
Figure 37:
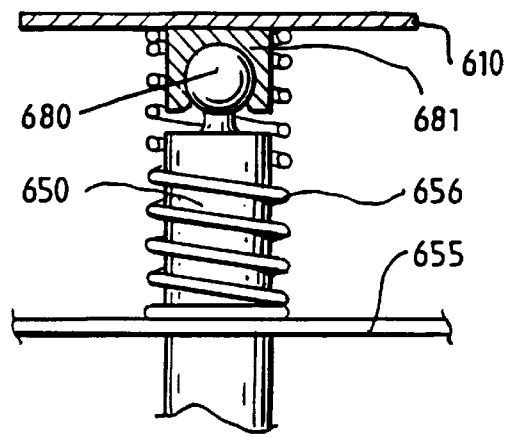
Figure 38:
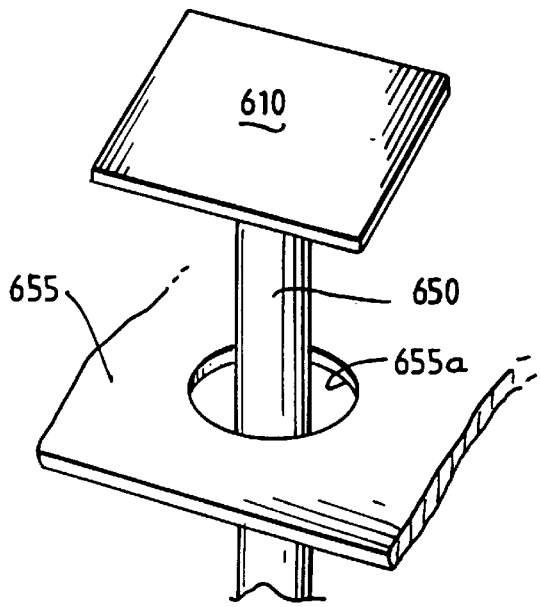
Figure 39:
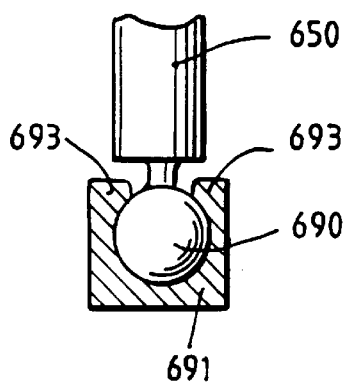
Figure 41:
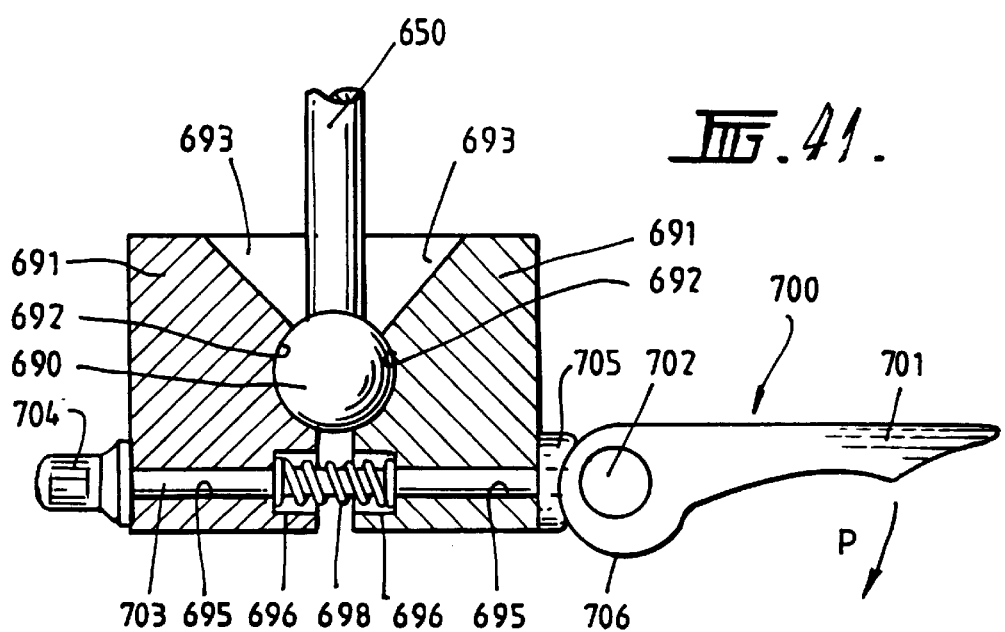

FIG. 6 a view of a second embodiment which relates seat of FIGS. 1 to 3;

FIG. 7 is a front view of another embodiment of the invention;

FIG. 8 is a plan view of the embodiment of FIG. 7;

FIG. 9 is a side view of the embodiment of FIG. 7;

FIG. 10 is a view of a compression lock of the embodiment of FIGS. 7 to 9;

FIG. 11 is a view of the lock of FIG. 10 in a closed position;

FIG. 12 is a view of a seat clamping mechanism of one embodiment of the invention;

FIG. 13 is an exploded view of the mechanism of FIG. 12;

FIG. 14 is a view of an alternative seat clamp mechanism;

FIG. 15 is a view of the mechanism of FIG. 14 in an open position;

FIG. 16 is an exploded view of part of the mechanism of FIGS. 14 and 15;

FIG. 17 is a view of a seat and mounting mechanism according to another embodiment of the invention;

FIG. 18 is a cross-sectional view of part of the embodiment of FIG. 17;

FIG. 19 is a view similar to FIG. 18 showing a modification;

FIG. 20 is a view similar to FIG. 18 showing a further modification;

FIG. 21 is a view similar to FIG. 20 showing yet a further modification;

FIG. 22 is an exploded view of another embodiment of the invention;

FIG. 23 is a view of the device of FIG. 21 in the assembled position;

FIG. 24 is a view of a seat and mounting post according to another embodiment of the invention;

FIG. 25 is a plan view of part of the mechanism of FIG. 24;

FIG. 26 is a perspective view of a seat according to a further embodiment of the invention;

FIG. 27 is a side view of the seat of FIG. 26;

FIG. 28 is a view of part of the seat of FIG. 26 in a first position;

FIG. 29 is a view of part of the seat of FIG. 26 in a second position;

FIG. 30 is a view of a seat adjusting mechanism according to another embodiment of the invention;

FIG. 31 is a view similar to FIG. 30 but with an additional modification;

FIG. 32 is a view of a seat according to another embodiment of the invention;

FIG. 33 is a view of another seat using the embodiment of FIG. 32;

FIG. 34 is a view of bed using the embodiment of FIG. 32;

FIG. 35 is a detailed view of part of the embodiment of FIGS. 32 to 34;

FIG. 36 is an alternative to the embodiments of FIG. 35;

FIG. 37 is a view of another mechanism which can be used in the embodiments of FIGS. 32 to 34;

FIG. 38 is a view showing a modification to the embodiment of FIG. 35;

FIG. 39 is a view showing a further modification;

FIG. 40 is a part exploded view of the modification of FIG. 39 with a locking mechanism;

FIG. 41 is a cross-sectional view of the modification of FIG. 40.

With reference to FIGS. 1 to 5 which refer to the first embodiment of the invention, a seat 10 is shown which has particular application to cycles and, in particular, to bicycles for high performance bicycle riding and leisure riding but which may also be used in other environments such as in rowing or the like where high performance posture is also required or a range of weight support is required.

The seat 10 has a seat portion 12 which is intended to receive at least part of the buttocks of a user. The seat portion 12 has rails 16 for coupling the seat portion to a post 14 via a seat post clamp 18. The clamp 18 includes an actuating lever 21 which can be actuated to enable the seat 10 to move relative to the post 14 as will be described in more detail hereinafter. This adjustment can take place whilst the rider is on the seat without the need to dismount.

The seat portion 12 has an abutment portion 30 which is moveable from a position shown in dotted lines in FIG. 1 and labelled 30' to the position 30 shown in solid lines in FIG. 1. In the position 30' shown in dotted lines in FIG. 1, the abutment portion 30 is generally co-planar with the seat portion 12 and forms part of the seat portion 12. The abutment portion 30 is pivotally coupled to the seat portion 12 by pivots 32 and can be moved between the positions shown in solid lines and dotted lines in FIG. 1 by an adjustment mechanism 40 which will be described in more detail hereinafter.

As best shown in FIGS. 2 and 3, the abutment portion 30 can be in two pieces 30a and 30b which could or could not be coupled together for fixed movement with one another relative to the remainder of the seat portion 12.

With reference to FIGS. 4 and 5, the adjustment mechanism 40 comprises a fixed sleeve 42 and a second tubular member 44 which is telescopically moveable relative to the sleeve 42. The sleeve 42 and member 44 are pivotally coupled at 41 to the abutment portion 30 and at 43 to a frame portion 19 of the seat 10. The sleeve 42 has a hole 47 and member 44 has holes 46 which can be aligned with hole 47 by telescoping the sleeve 42 relative to member 44. A spring 50 is arranged between the frame 19 and an abutment 48 at the end of the member 44. The spring 50 therefore biases the abutment portion 30 in the direction of arrow A in FIG. 4.

As shown in FIG. 5, pin 52 is locatable through aligned holes 46 and 47 in the sleeve 42 and member 44 to fix the sleeve 42 and member 44 together and thereby locate the abutment portion 30 in a chosen position. The pin 52 is coupled to a cable 54 which extends to, for example, the handle bars (not shown) of a bicycle (not shown) and to an actuating knob (not shown). The cable 54 carries a spring 56 which biases the pin 52 into the aligned hole 46. The spring 56 is connected to the cable 54 adjacent the inner end of pin 52 and abuts fixed plate 55 so the spring is compressed against plate 55 when the cable is driven to the left in FIG. 5. The plate 55 may form part of the seat frame 19 or be connected to the seat frame 19. The pin 52 may have a plate 57 connected to it which sits on the outside of the sleeve 42 and which is coupled to the spring 56 to thereby attach the pin 52 to the spring 56.

In order to adjust the seat 10 shown in FIG. 1 so that the abutment portion 30 is moved between the position shown in dotted lines in FIG. 1 and the position shown in solid lines, a rider seated on the seat can manipulate the control knob on the handle bars so that the cable 54 is moved to pull the pin 52 against the bias of the spring 56 out of the aligned holes 46 and 47. This will enable the member 44 to move telescopically relative to the sleeve 42 so that the abutment portion 30 can be pushed by the spring 50 towards the position shown in FIG. 1. By the rider simply shifting his weight off the seat the abutment portion 30 can therefore be allowed to move relative to the remainder of the seat portion 12 into the position desired by the rider. The control knob can then be released to release the cable 54 so that the spring 56 biases the pin 52 back into a pair of aligned holes 46 and 47 to again lock the member 44 to the sleeve 42. Thus, the abutment portion 30 will be locked into the position to which the rider has enabled it to move by simply shifting his weight and allowing the spring 50 to bias the member 44 to the desired position.

The holes 46 could be provided with funnel shaped entrances (as seen in FIG. 5) or other guides to enable the pin 52 to locate in a hole 46 when aligned with hole 47 so the pin 52 will successfully re-enter the aligned holes 46 and 47 to lock the members 42 and 44 together.

To return the abutment portion 30 to the position where it is co-planar with the remainder of the seat surface 12, the control knob is again activated to pull the cable 54 so that the pin 52 is drawn out of the aligned opening 46 against the bias of the spring 56. The rider can simply push back with his weight to thereby push the portion 30 and the member 44 relative to the sleeve 42 in telescopic fashion so that the portion 30 returns to the co-planar position shown in dotted lines in FIG. 1. The control knob can be released so that the pin 52 is again biased into a pair of holes 46 and 47 to lock the sleeve 42 and member 44 together and thereby lock the abutment portion in the position shown in dotted lines in FIG. 1.

The amount of movement of the cable 54 and pin 52 may be such that when the cable is pulled to the left in FIG. 5, the pin is completely withdrawn from the hole 46 and passes through the hole 47 in sleeve 42 but does not completely leave the hole in sleeve 42 so that the pin is held within the hole sufficiently clear of the member 44 to allow movement of the member 44 until the cable 54 allows the pin 52 to move under the bias of the spring 56 back into one of the holes 46.

FIG. 6 shows an arrangement similar to FIG. 5 but for use in the seat of FIGS. 2 and 3 in which two abutment portions 30a and 30b are used. In this embodiment, two members 44' are included and a pair of pins 52' are arranged on a connecting link 57. Spring 56' is connected to link 57 so that when the cable 54 is pulled to the left, the link 57 is moved to draw the pins 52' out of holes 46' in members 44'. This embodiment shows the pins retracted but still within holes 47' in sleeves 42'. Thus, when the pins 52' are retracted as shown in FIG. 6, the members 44' can slide relative to the sleeves 42' under the influence of springs 50 (not shown in FIG. 6) to move the members 44' and therefore the abutment portions 30a and 30b in the same manner as described above.

When the abutment portion 30 is in the co-planar position shown by dotted lines in FIG. 1, a rider of the bicycle can seat on the seat portion 12 with a lot of the rider's weight seated on the seat portion 12. The seat portion 12 is dimensioned for relative comfort so that the rider is comfortably positioned for casual pedalling of the bicycle. If the rider wishes to move into a high performance position where efficiency is increased, the portion 30 can be moved into the position shown in solid lines in FIG. 1 so that the rider's anatomy abuts only against the portion 30 and not against the remainder of the seat 12 so that the portion 30 acts as a reaction surface for the rider's tissue adjacent the ischial bones so that the rider is placed in a standing or semi-standing position so that maximum pedal power can be efficiently delivered.

As explained in my aforesaid earlier international application PCT/AU94/00284, the abutment portion 30 can be dimensioned so that it is sized to receive primarily only the portion of the rider's anatomy adjacent the ischial bone(s) so that the person's soft tissue or muscle substantially outside the ischial bone(s) is not compressed or squeezed when the rider is on the seat. In the position shown in solid lines in FIG. 1, the rider will be placed in a standing position in which it is generally not possible to permanently sit on the abutment portion 30, without receiving other support, with the backbone of the rider arranged generally vertically so that the rider is placed in a standing position on the cycle pedals so as to be in a position to deliver substantially maximum pedal power efficiently and whilst held stably. Thus, the position shown in solid lines in FIG. 1 is the optimum high performance position of the seat in which maximum pedal power can be delivered and the rider is placed in a generally standing position on the pedals of the bicycle with the portion 30 acting as an abutment and reaction surface and stabiliser for the part of the rider's anatomy adjacent the ischial bone(s).

By relocating the pin 52 into another of the aligned openings 46 so that the abutment portion 30 is arranged somewhere between the position shown in solid lines in FIG. 1 and the position shown in dotted lines in FIG. 1, the rider can be supported so that more pedal power can be efficiently delivered than when the rider is in the fully seated position on the seat portion 12 and with a percentage of the rider's weight supported on the abutment portion 30, thus the abutment portion 30 can be adjusted between the position where it is co-planar with the remainder of the seat portion 12 and the position shown in solid lines in FIG. 1 where maximum pedal power is efficiently delivered, so as to place the abutment portion 30 in an intermediate position where more pedal power is efficiently delivered than in a fully seated position but where the rider still has some of his weight taken by the abutment portion 30.

The abutment portion 30 can receive the portion of the rider's anatomy adjacent the ischial bones as described above or other portions of the person's anatomy as outlined in my earlier international application referred to above.

Rather than use the spring biasing arrangement described with reference to FIGS. 4 and 5, the spring 50 could be replaced by a pneumatic or hydraulic piston or other spring arrangement which can be operated by, for example, a push button arranged on the handle of the bicycles to adjust the abutment portion 30.

FIGS. 7 to 9 show a second embodiment of the invention which is similar in function to the embodiment of FIGS. 1 to 5. In this embodiment, the seat 101 comprises four separate seat portions 102, 103, 104 and 110. The seat portions 102, 103, 104 and 110 include base plates 102', 103', 104' and 110' which are made from metal or other suitable material and upholstered or cushioned sections 102", 103", 104" and 110" supported on the base plates 102' to 110'. A pair of mounting rails 111 are arranged beneath the seat portions 102 to 110 and are provided for coupling the seat 101 to a bicycle mount or frame (not shown). A central sleeve 112c is welded to the rails 111 at 113 as best seen in FIG. 8.

The seat portions 102 to 110 have lugs 114 which are welded or otherwise coupled to plates 102' to 110'. A pivot rod 115 extends through the lugs 114 so the portions 102 to 110 can pivot on rod 115 (as will be explained in more detail hereinafter) and nuts 116 are provided at the ends of the rod 115 to secure the rod 115 in place in the lugs 114. A coil spring 117 is provided about the rod 115 and has a first arm 118 which is biased on a sleeve 112b and a second stepped arm 119 which passes through lug 114 and abuts the underside of plate 110' to bias the portion 110 out of the plane of the paper in FIGS. 7 and 8 and in the direction of arrow A in FIG. 9.

A coil spring 121 is provided at the other end of the rod 115 and has arms 118 and 119 which are identical to the arms 118 and 119 previously described. The arm 118 is biased on sleeve 112a and arm 119 contact plate 102' for biasing the portion 102 out of the plane of the paper in FIGS. 7 and 8 and in the direction of arrow A in FIG. 9. Coil springs 123 and 124 are also provided on the rod 115 and have arms 125 which abut plates 103' and 104' respectively and bias the seat portions 103 and 104 in the same direction as the seat portions 102 and 110. The springs 123 and 124 have second arms 127 which are bent to curve over rails 111 to locate the spring 123 and 124 in place and to provide a reaction for the springs 123 and 124 so that the arms 125 can bias the seat portions 103 and 104 in the manner previously described.

The seat portions 102 and 110 have struts 120 connected to plates 102' and 110' respectively and which, as best seen in FIG. 9, are curved and are each provided with a slot 128.

A rod 130 is provided in the sleeves 112a, 112b and 112c. A nut 131 is provided on the end of the rod 130 and a washer 132 is provided between the strut 120 and nut 131. An abutment portion 133 is provided on the sleeve 112 and the rod 130 extends through slots 128 in struts 120 so that the washer 132 and abutment 133 effectively sandwich the strut 120.

The opposite end of the rod 130 is provided with a quick release cam lock 140 and a washer 141 arranged on the rod 130 and an abutment 142 on the sleeve 112 sandwich the strut 120 associated with the seat portion 102 in exactly the same manner as described with reference to the seat portion 110.

When the quick release cam lock 140 is in the position shown with reference to FIGS. 7 to 9, the cam lock is locked in position so that the washers 141 and 132 and abutments 142 and 133 tightly sandwich the struts 120 so that the seat portions 102 and 110 are locked in position against the bias of the springs 117 and 121. A second sleeve 144 is formed in segments 145a, 145b, 145c and 145d which carry abutments 147. The segment 145c is welded to rails 111 in the same manner as sleeve 112c. A rod 150 is arranged within the sleeve 144. The rod 150 has a nut 151 at one end and a washer 152. The rod 150 also carries washers 153. The washers 152 and 153 and the abutments 147 sandwich second struts 157. The rod 150 has a second quick release cam lock 158 which operates in exactly the same manner as the cam lock 140.

Quick release cam locks or compressor locks of the type shown with reference to items 140 and 158 are known. For the purpose of illustration, cam lock 140 is shown in the open position in FIG. 10 and in the locked position in FIG. 11. The rod 130 is connected to a cylindrical boss 301 which is received within the cam lever 140. The lever 140 has a cam profile 302 which rides on washer 141. The cam profile 302 has a slot (not shown) for accommodating the rod 130. In the open position, the profile 302 is separated from the centre of the boss 301 by a relatively small distance X shown in FIG. 10. The washers 141 and 132 are therefore not pressed tightly against the struts 120 so that the struts 120 can move relative to the rod 130 as explained above. When the cam lever 140 is moved to the closed position shown in FIG. 11, a relatively larger distance Y is provided between the cam profile 302 and the centre of the boss 301 which effectively pushes the washer 141 to the left in FIG. 11 relative to the rod 130 which is connected to the boss 301 so that the washer 141 and abutment 142 and the washer 132 and abutment 133 tightly sandwich the struts 120 to lock the sleeves 112a, 112b and 112c onto the struts 120.

The cam lock 158 operates in exactly the same manner as the cam lock 140 except that the outer sleeve 144 is in a number of segments 145.

Movement of the cam locks 140 and 158 can cause the struts is 120 to slightly flex a very small amount during the sandwiching operation to lock the sleeves 112 and sleeve segments 145 onto the respective struts 120 and 157.

As has been explained above, in the locked position shown in FIGS. 7 to 9, the cam locks push the sleeves 112a and 112b and the sleeve portions 145a, 145b and 145d relative to the respective rods 130 and 150 so the struts 120 and 157 are sandwiched tightly by the washers 132 and abutments 133 and the washers 153 and abutments 147 so that the seat portions 102 to 110 are locked in position. By releasing the cam locks 140 and 158 simply by flicking them in the direction of arrow B in FIG. 7, tension or compression is removed from the sleeves 144 and 112 so that the sleeve portions 145a, 145b and 145d, and 112a and 112b can move slightly relative to the rods 130 and 150. The struts 120 and 157 can flex slightly when locking and/or unlocking occurs. This removes the tension or locking force applied to the struts 157 and 120 so that the springs 121, 123, 124 and 117 bias the seat portions 102 to 110 in the direction of arrow A in FIG. 9 as explained above.

Thus, the seat 101 of FIGS. 7 to 9 can be used in the same manner as the seat of FIGS. 1 to 5 by simply releasing the quick release cam lock 158 so that the seat portions 103 and 104 can be biased out of the plane of the seat as shown in FIGS. 7 and 9 in the direction of arrow A to form a high performance abutment portion which functions in the same manner as described with reference to the abutment portion of FIGS. 1 to 5. In this embodiment, the rider can use his weight against the bias of the springs 123 and 124 so as to push the portions 103 and 104 back into a desired position until they are set correctly and then lock the quick release cam lock 158 by simply moving it in the direction opposite arrow B in FIG. 7 to thereby clamp the struts 157 in a desired position relative to the rod 150. The movement between the struts 157 and rod 150 is accommodated by the slot 155 in the strut 157. Furthermore, in this embodiment the portions 102 and 110 which make up the remainder of the entire seat surface can also be adjusted by unlocking the quick release cam lock 140. Thus, the present invention enables adjustment of the seat portions 103 and 104 alone by unlocking the quick release cam lock 158, adjustment of the seat portions 102 and 110 alone by unlocking the quick release cam lock 140 or adjustment of all four seat portions by unlocking both cam locks 158 and 140.

If desired a rider can leave the cam locks 140 and 158 unlocked so the seat portions float rather than be locked back into a single position.

The degree of pivotal movement of the seat portions 102 to 110 is preferably from −10° (ie 1° below horizontal) to 90°. For leisure riding, the range is preferably 10° to 30°, for intermediate riding (which would include leisure riding and some training riding) the range is 0° to 50°, for racing the range may be in different ranges depending on type of riding, distance etc and performance requirements from 30° to 60°, 20° to 60° or 40° to 90°, for specific high intensity (ie Velodrome, road time trials) from 50° to 60°, 50° to 70°, 50° to 80°, 30° to 40° (for training in this type of riding) and 30° to 50° (also for training).

The embodiment of FIGS. 7 to 9 may also include locking bars 305 and 307 and lugs 308 and 309 which may be fixed to the seat portions 102 and 110. The lugs 308 and 309 have holes for receiving bar 305 and nuts 310 and 311 can be screwed onto screw threads on the ends of the bar 305 to secure the bar 305 within the lugs 308 and 309. The use of the bar 305 ensures that the portions 102 and 110 move together as a single unit. Similarly, bar 307 can be received in lugs 312 and 313 connected to seat portions 103 and 104 to ensure that the seat portions 103 and 104 move together as a single unit. The seat portions 102 and 110 can have ancillary lugs 314 and 315 and a small locking bar (not shown) could be used instead of the locking bars 307 and 305 with one locking bar extending between the lug 313 and the lug 315 and another extending between the lug 314 and 312 so that the seat portions 102 and 103, and/or seat portions 104 and 110 can move as single unitary members. Use of the locking bars as shown in FIG. 8 therefore enables the seat portions 102 and 110 to move as a single unit depending on the position of the seat portions 103 and 104, and the seat portions 103 and 104 are caused to move as a single unitary movement by the bar 307. Alternatively, if the bars 305 and 307 are removed and the short bars (not shown) referred to above are inserted into the lugs 314, 312 and 313, 315 the seat portions 102 and 103 can move as a single unitary unit and the seat portions 104 and 110 can move as a single unitary unit. In the later arrangement by unlocking the cam locks 140 and 158, the seat portions 102 and 103 and the seat portions 104 and 110 can move pivotally back and forward with a rider's legs during pedaling movement against the bias of the springs 121, 123, 124 and 117 as the person's legs move during pedalling motion. Alternatively a single rod could pass through all the lugs 314, 312, 313 and 315 to secure all the seat portions as one unit.

FIGS. 12 and 13 show the seat clamp 18 shown in FIGS. 1 and 2 in more detail. In this embodiment, seat 100 is configured differently to the seat shown in FIGS. 1 and 2 but it does include rails 16 which perform precisely the same function as the rails 16 shown in FIGS. 1 and 2 and that is to be engaged by the clamp 18.

As is best shown in FIG. 12, the rails 16 have sleeve members 320 provided on the parts of the rails 16 which are to be engaged within the clamp 18 to provide a larger diameter for gripping by the clamp 18. The clamp 18 includes a shaft 321 which has an intermediate section 322 of generally square cross-section, a threaded end circular section 323 and a circular shaft portion 324 opposite the end 323. The shaft 324 has a screw thread 325 (see FIG. 13) for screw threaded engagement with a cylindrical boss 326. The boss 326 is receivable within a bore 327 in cam lever 328 (which is identical to the cam lever 140 and 158 described with reference to FIGS. 7 to 12. In order to assemble the boss and cam lever, the boss 326 is located in the bore 327 and then the rod 324 is screwed into a screw-threaded hole 329 in the boss 326. The shaft 324 and therefore the rod 321 is then located through the other components of the clamp shown in FIGS. 12 and 13 as will be explained below and as is evident from FIG. 12. A washer 331, having a circular hole is provided on the shaft 324 adjacent Cam profile 332. As is best shown in FIG. 12, the washer 331 has a surface which matches the profile of the cam surface 332. A sleeve 333, which is merely a spacer sleeve and which is used dependent on the length of the rod 324 is then provided on shaft 324 and a washer 335 having a circular hole is provided at the other end of the sleeve 324. First and second clamp parts 336 and 337 have circular holes and are provided on shaft 324 and together form a channel 338 for receipt of the one of the sleeves 320 and associated rails 16 of the seat 100. A seat post clamp 339 has a bracket section 350 (see FIG. 13) for receiving post 14 (see FIG. 1) to which the bicycle seat 100 (or seat 12 in FIG. 1) is to be connected. The clamp 339 has a first lug 340 which has a first wall 343 having a circular hole for receiving shaft 324 and a second wall 344 having a square hole for receiving the square profile of the portion 322 of the shaft 321. The clamp 339 has a second lug 341 which has first and second walls 346 which have square holes for accommodating the rod portion 322. A second pair of clamp parts 361 and 362 (which are generally identical to the clamp parts 336 and 337) define a channel 363 for receiving the other sleeve 320 and its associated rail 16. The clamp part 361 has a square hole for receiving the square profile of the portion 322 of the shaft 321 and the clamp part 362 has a circular hole for receiving screw-threaded portion 323. A nut 365 is screwed onto the screw-threaded part 323 to hold the components in place on the shaft 321 and to provide a reaction for movement of cam lever 328.

FIG. 12 shows the cam lock in the open position and in this position tension is removed from the clamp portions 336 and 337 as well as clamp portions 361 and 362 and lugs 340 and 341. Thus, the seat can move back and forward into and out of the plane of the paper in FIG. 12 to adjust the seat backward and forward by the rail 16 and associated sleeves 320 sliding in the respective channels 338 and 363. Furthermore, the seat can be raised up and down on post 14 or swivel on post 14. In order to lock the seat in a certain position, the lever 328 is simply rotated in the direction of arrow H in FIG. 12 so that cam profile 332 pushes against washer 331 to in turn push shaft 324, washer 335, clamp halves 336 and 337, lugs 340 and 341 and clamp halves 361 and 362 together whilst pulling the shaft 321 and nut 323 to the right. As is best seen in FIG. 13, the lever 328 has a slot 328a for receiving shaft portion 324 and accommodating pivotal movement of the lever 328 relative to the shaft 321. Thus, the clamp parts 336 and 337 tightly squeeze onto sleeve 320 so that the channel 338 effectively closes onto the sleeve 320. The clamp parts 361 and 362 operate in the same manner so that the channel 363 closes onto the sleeve 320 associated with the other rail 16. Similarly, the lugs 340 and 341 are pushed slightly together so that they firmly cause the bracket 350 to squeeze onto the post 14. Thus, the seat 100 is locked in a desired position on the post 14.

Once again, in this embodiment the seat can be adjusted while the rider is pedalling the bicycle by the rider simply manipulating the lever 328 and jiggling himself on the seat to change its position. The seat can then be again locked in position by simply returning the lever 328 to the closed position. As will be explained in relation to other embodiments, the seat could be biased so the rider does not have to jiggle or physically move the seat himself.

FIGS. 14, 15 and 16 show another seat mounting mechanism.

In this embodiment, post 14 is provided with support 370 which has a convex surface 371. The surface 371 may be provided with grooving 373 as shown in FIG. 16. A clamp half 372 is received on concave surface 371 and the clamp half 372 may have grooving to match and engage with grooving 373 for holding the clamp half 372 to the surface 371 in a desired position. The clamp half 372 has channel halves 374 for receiving the rails 16 (as shown in FIG. 1 and FIG. 12) of a seat (not shown in FIGS. 14 to 15). An upper clamp half 375 is provided with channels 376 which match the channels 374 and form holes for the rails 16. An elongate hole 378 is provided through the support 370 and holes 379 and 380 are provided through the clamp parts 372 and 375. A rod 377 passes through the holes 378, 379 and 380 and the rod 377 has a screw-threaded end for receiving a nut 381. The other end of the rod 377 has a cam lever 382 which is coupled to the rod 377 by a cylindrical boss 383 in exactly the same manner as described with reference to FIGS. 12 and 13.

In the position shown in FIG. 14, the cam lever 382 is closed so that the cam profile 386 pulls the clamp halves 375 and 372 together and also pulls the clamp halves 372 and 375 down onto the surface 371. Thus, rails 16 (not shown) will be locked in the holes formed by the channels 374 and 376.

When the lever 382 is pivoted into the position shown in FIG. 15, tension is released so that the clamp parts 372 and 375 can move slightly apart to enable the rails 16 (not shown) to move in the holes formed by the channels 374 and 376 to adjust the position of the seat. Similarly, the clamp parts 372 and 375 can move in the direction of doubled headed arrow G in FIG. 15 so as to pivot the seat relative to the post 14 with the slight movement of the rod 377 being accommodated in elongate slot 378. When the seat is in the desired position, the cam lever 382 is returned to the position shown in FIG. 14 to lock the rails in the clamp halves 372 and 375 and also to lock the clamp half 372 to the concave surface 371 in the new position.

If desired, a washer 385 (see FIG. 16) can be located between the cam lever 382 and the support portion 370 for providing a bearing surface on which the cam profile 386 can ride.

Once again, this seat mounting mechanism can be adjusted whilst the rider is riding the bicycle by simply manipulating the cam lever 382 from the open position to the closed position and when in the open position, moving the seat by rocking back and forward or the like to adjust the seating to the desired position. As in the previous embodiment, the seat could be biased to reduce or avoid the need for the rider to jiggle the seat into position.

FIGS. 17 and 18 show yet a further seat and mounting mechanism. The seat and mounting mechanism of FIG. 17 includes the mounting mechanism of FIGS. 14 and 15 and like reference numerals indicate like parts which have already been described with reference to FIGS. 14 and 15. In this embodiment, the rails 16 of the seat 400 are received in sleeves 401, the rails 16 have an enlarged diameter end 403 (FIG. 18) which extends out of the sleeves 401 and into a tube 404. The tube 404 is telescopically moveable within sleeve 401. Springs 405 are located in each of the tubes 401 between an end 407 of the sleeve 401 and the end 408 of the tube 404. The tubes 404 are integral with angled support bars 410 which carry the seat 400. In this embodiment, as can be clearly seen in FIG. 17, the seat 400 is formed in two parts with each part being carried by one of the support bars 410. A spring 411 is arranged within the tube 404 between the large diameter end 403 of the rod 16 and a reduced diameter section 412 where the tube 404 merges into the support bar 410.

The springs 405 and 411 bias the seat 400 forward in the direction of arrow L in FIGS. 17 and 18.

In this embodiment, the seat 400 is generally in the form of a high performance inclined seat as disclosed in my earlier International Patent Application No. PCT/AU94/00284. When a rider seats on the seat 400 and pushes backward, the seat 400 can move horizontally backwards in a direction opposite arrow L until the tube 404 is pushed backward so that end 408 abuts spring 405 and pushes spring 405 against end wall 407. Further backward movement will compress spring 411 until that spring is fully compressed and them compress spring 405 until that spring is fully compressed to thereby move the seat 400 back to a rearmost position. As the rider moves forward, as may be necessary in order to deliver more pedal power, the seat 400 will therefore be biased forward in the direction of arrow L by the springs 411 and 405 so that the seat 400 basically remains in contact with the rider's buttocks to support the rider and provide a reaction. Thus, the seat 400 is basically floating in a horizontal direction and can be pushed back by the rider's weight and when the rider moves forward, can follow the rider forward by virtue of being biased forward by the springs 404 and 405 for independent movement of each seat part or for movement of the entire seat 400 as a unit.

The embodiment of FIG. 19 is generally the same as the embodiments of FIGS. 17 and 18 except a locking mechanism 420 is included. The tube 404 is provided with a number of holes 421 and the sleeve 401 is provided with a support arm 422 which carries a support plate 423. The plate 423 has a hole 424 and the pin 425 is arranged through the hole. A spring 426 is provided on the pin 425 between plate 423 and an abutment 427 on the pin 425. The spring biases the pin 425 in the direction of arrow K through a hole 429 in the sleeve 401 so that the pin can pass into one of the holes 421 to lock the tube 404 relative to the tube 401 to thereby lock the seat 400 into a desired position. The pin 425 can be controlled by a cable 430 which can lead to a control lever on the handle bars of the bicycle and which can be adjusted by manipulation of the control lever to draw the pin out of the holes against the bias of the spring 426 and when released, the pin 425 is biased by the spring 426 into a pair of aligned holes 429 and 421 depending on the position of the seat 400.

FIG. 20 shows an embodiment similar to the embodiments of FIGS. 17 to 19 except in this embodiment, a fixed sleeve 440 is provided which is adapted to be mounted to a bicycle by a mount (not shown). The sleeve 440 has an end 441 and receives a seat support rod 16 which is connected to a seat (not shown). A bush 442 is provided in the open end of the sleeve 440 for guiding rod 16. The rod 16 has an enlarged diameter end 443 and a plurality of holes 444 arranged along its length. A spring 445 is provided between end wall 441 and large diameter end 443 of the rod 16 to bias the rod 16 and therefore the seat forward in the direction of arrow M in FIG. 20. A locking mechanism 420 which is identical to the mechanism described with reference to FIG. 19 is provided so that pin 425 can be biased into one of the holes 444 to lock the rod 16 and therefore the seat in a desired horizontal position. This mechanism operates in the same manner as that of FIG. 19 and enables the rider to use his weight to push the seat backward and the seat can be selectively locked in a desired position and released when desired so that the seat will be biased forward by the springs 445 to follow the rider as the rider moves forward whilst pedalling.

FIG. 21 is similar to FIG. 20 except that the locking mechanism 420 is omitted so that the seat is completely free floating without the ability to lock in place.

If the angular position of the seat is adjusted by the mechanism of FIGS. 12 to 16 concurrently with that of the mechanisms of FIGS. 18 to 21, the change in horizontal position is along an angular path rather than a horizontal path.

FIGS. 22 and 23 show an embodiment in which the seat is guided along an arcuate path between a lower rearward position and an upper forward position. In this embodiment, a rail block 500 has a generally curved cylindrical boss 501 which has an arcuate hole 502 extending longitudinally through it. A pair of mounting rails 503 are coupled to the boss 501 for connection to a clamp of a mounting system such as the mounting mechanisms described with reference to FIGS. 12 to 16. An arcuate sleeve 506 has a slot 507 on its underside and one end is closed by a closure plate 508 which carries an arcuate rod 509 which extends within the sleeve 506. The other end of the sleeve 506 is closed by a pivot bracket 510 which has a reduced diameter section 511 which has a hole (not shown in FIG. 22) into which the end of rod 509 is inserted to securely locate the rod 509 within the sleeve 506. The reduced diameter portion 511 seats into the end of the sleeve 506.

A spring 515 is arranged within the sleeve 506 about rod 509 and extends between boss 501 and the pivot bracket 510. When the boss 501 is arranged within the sleeve 506, the rod 509 passes through hole 502. Since the rails 503 are fixed to thereby fix the boss 501, the sleeve 506 is able to slide on the boss 501. The spring 515 will bias the sleeve 506 into a position where the sleeve 506 and brackets 510 and therefore seat 550 is in a forward upper position.

The pivot bracket 510 has a bifurcated portion 521 and aligned holes 522 are provided in the bifurcated portion for receiving a quick release clamp lock 560 (shown in FIG. 23) as described in the previous embodiments (but not shown in FIG. 22). Springs 523 are provided in the bifurcated portion 521 on the rod (not shown) of the quick release cam lock and has a pair of arms 524 which bias a seat bracket 525 into a certain position. The seat bracket 525 has aligned holes 526 which are also arranged on the rod of the quick release cam lock so that the wings 527 of the bracket 525 can overlap the bifurcated portion 521 so that the holes 526 can align with the holes 522 and with the rod of the quick release cam lock passing through the aligned holes and also through the springs 523.

The bracket 525 has a pair of stems 530 upon which seat 550 is provided. As is clear in FIG. 22, the seat 550 is provided in two parts 551 and 552 and each part has a pair of lugs 524 having a hole 525a so that the seat parts 551 and 552 can slide onto the stems 530. Springs 533 (only one shown) may also be provided on stems 530 for biasing the seat parts 551 and 552 into a certain position.

Thus, the quick release cam lock which passes through the aligned openings 522 and 526 can be opened and closed to enable pivotal movement of the seat 550 against the bias of springs 523 into a desired position and then the quick release cam lock can be locked in position. The seat components 551 and 552 can be individually moveable on stems 530 against the bias of springs 533 during pedalling movement or alternatively the components 551 and 552 can be fixed and not free to move.

The sleeve 506 has a pair of aligned slots 541 which form a through slot and the boss 501 has a transverse hole 542 which is in registry with the slot 541 so that a quick release cam lock 570 (FIG. 23) can pass through the slot 541 and through the hole 542 to thereby lock the sleeve 506 relative to the boss 501 to in turn lock the position of the seat 550 at a certain place along the arcuate path formed by the arcuate sleeve 506. When the lock is released, the rider can push backward against the bias of the spring 515 so that the spring is compressed and the sleeve 506 moves downwardly in a direction of arrow N relative to boss 501 to a more rearward lower position. When the rider moves forward and the locking pin is released, the seat 550 will be biased forward by spring 515 along the arcuate path to a more forward upper position. The seat 550 can be locked in any intermediate position by simply locking the pin through the slot 541 and into the hole 542.

As is shown in FIG. 23, the quick release cam locks 560 and 570 are basically the same as those described in other embodiments. The locks 560 and 570 have cam levers 561 and 571 respectively. When the lever 571 is in the closed position, the sleeve 506 in the vicinity of the slots 541 is squeezed inwardly onto the block 500 to lock the sleeve 506 to the block 500. When the lever 571 is open, the tension is released so that the sleeve 506 can move relative to the block 500 as explained above.

Similarly, when lever 561 is in the open position, tension is released from the bracket 525 and the pivot bracket 510 so that the bracket 525 can pivot relative to the bracket 510. When the lever 561 is closed, the brackets 510 and 525 are squeezed tightly together to lock in a fixed position.

The structure shown in FIGS. 22 and 23 allows optimum leg extension to be obtained and maintained through a range of seat positions and cycling postures due to the curved shape of the guide.

FIGS. 24 and 25 show yet a further embodiment of the invention which includes a mounting post 575 which is formed in post segments 576 and 577. The segment 576 includes a top bracket 578 which is coupled to the segment 576 by a reduced diameter portion 579 which fits into the segment 576. The bracket 578 is bifurcated and has two wing portions 580. The wings 580 have aligned holes 580a. The segment 577 also has a bifurcated bracket 581 which has wings 582 which are dimensioned to seat between the wings 580. The wings 582 have holes 582a which align with the holes 580a in the wings 580 for receiving a shaft 583 of a quick release cam lock 584. The cam lock 584 is the same as the quick release cam locks previously described. A sleeve 586 fits over the shaft 583 and a spring 587 is arranged on the sleeve 586. The spring 587 has a first arm 588 which presses against the bracket 581 and therefore the segment 577 and a second arm 589 which presses against the bracket 578 and therefore the segment 576. Thus the spring 587 biases the segments 576 and 577 into a certain position. The cam lock 584 may be manipulated by moving cam lever 590 in the same manner as described with reference to the other embodiments to open the cam lock so that the segments 577 and 576 can be pivoted relative to one another on the shaft 583 of the cam lock which forms the pivot shaft for the segments 576 and 577. Thus, the segments 576 and 577 can be pivoted against the bias of the spring 587 into a desired position and locked in place by returning the lever 590 to the closed or locking position.

The segment 577 may have a bracket 590a and seat 591 which are similar to the bracket 510 and seat 550 described with reference to the embodiment of FIG. 25. A quick release cam lock 560 identical to that in the embodiment of FIG. 25 is also included. In this embodiment, the seat 591 is provided with a bifurcated bracket 592 which has wings 593. The wings 593 have holes for registry with holes in the bracket 590a and for receiving the shaft of the quick release cam lock 560 to thereby couple the seat 591 to the bracket 590a. Once again, a spring 524 is included for biasing the seat 591 into a certain position and the quick release cam lock 560 can lock the seat 591 into a desired position after movement of the seat against the bias of the spring 524 into a desired position.

This embodiment also allows optimum leg extension as in the previous embodiment and allows for changes in bicycle design because it allows the seta to be positioned from a remote mounting.

FIGS. 26 to 29 show a further embodiment of the invention. In this embodiment a seat 800 is provided with a pair of rails 801 which can be clamped to a bicycle by the clamp described with reference to FIGS. 12 to 16 or by any other suitable mechanism. The seat 800 has a peripheral frame 802 and a pair of intermediate frame elements 803. The frame elements 803 are included because in the embodiment shown in the drawings the seat is formed in two separate seat portions 804. However, the frame members 803 could be omitted and the seat could be formed from a single continuous member supported by the peripheral frame 802. The two seat portions 804 are formed from spring metal sheets.

As is best shown in FIGS. 28 and 29, which are a rear view of part of the peripheral frame 802, the seat member 804 and one of the intermediate elements 803, the spring metal sheet 804 has a convex central portion 806 (convex with respect to a person seated on the seat) and a pair of flanges 807 which are integral with the convex portion 806.

A plurality of cross bars 809 extend between the peripheral frame member 802 and a respective intermediate frame element 803 for supporting the spring metal sheets 804. As is clearly shown in FIGS. 28 and 29, the flanges 807 sit behind the frame members 802 and 803 and are retained in place by the cross members 809. The convex central portion 806 projects out through the space between the frame members 802 and 803 to form portions for receiving a rider's buttocks and, in particular, any area of the ischial bone(s) as described in earlier embodiments.

FIG. 28 shows the position of the sheet members 804 when no load is applied with the convex portion 806 projecting out to its maximum degree. When a person seats against the seat portion, the convex portion 806 is flattened out somewhat as shown in FIG. 29 with the flanges 807 moving laterally outwardly in the space between the frame member 809 and the frame members 802 and 803. The spring metal sheets 804 flex and provide a spring loading to the rider and also flex and move to conform to a user's anatomy when the user sits against the seat. Thus, apart from flattening out as shown by FIG. 29, the concave body 804 can also flex against its natural spring nature to conform to a user's anatomy where appropriate thickness, basic shape and type of material is used.

In other embodiments not shown, rather than retaining the spring metal sheets 804 by flanges 807 and the cross members 809, the spring metal sheets could merely be welded or otherwise attached to the frame.

FIG. 30 shows yet a further embodiment of a seat mounting. In this embodiment, a pair of arcuate rails 850 are provided with slots 851 and are connected in parallel with respect to one another by connecting rods 852 at the top and bottom of the rails 850. The mechanism includes a frame block 853 which has generally U-shaped channels 854 on each side formed by L-shaped flanges 855. A pair of rails 856 are provided in the channels 854 for sliding movement. The rails 856 are provided with slots 857. The frame block 853 has two rails 859 which can be connected to a seat mounting of the type described with reference to FIGS. 12 to 16 or any other suitable mounting. Thus, the frame block 853 is fixed in place on the bicycle. A quick release cam lock 860, which is identical to the quick release cam mechanisms previously described and therefore will not be described in further detail, is provided for clamping the rails 856 in the channels 854 by squeezing the rails 856 against base portion 861 of the channels 854. Thus, by opening the quick release cam lock 860, tension is released so that the rails 856 can slide in the channels 854 and the quick release cam lock 860 can be closed to lock the rails and therefore a seat in a desired position relative to the frame block 853. A second quick release cam lock 870 is provided for coupling the rails 856 to the rails 850. The quick release cam lock 870 passes through the slots 851 through holes 871 at the ends of the rails 856 and through a sleeve 872 between the rails 856. Once again, by opening the quick release cam lock 870, the rails 850 can move upwardly and downwardly relative to the rails 856 with the movement of the rails 850 relative to the quick release cam lock 870 being accommodated by the slot 851.

A seat (not shown) is supported on the rails 850 and may be of the type shown in any one of the earlier embodiments. Thus, by opening the quick release cam locks 860 and a person using his weight on the seat, the rails 856 can be pushed backwards to slide in the direction of arrow S to adjust the horizontal position of the seat and the quick release cam lock 860 can then be closed to lock the seat in a desired horizontal position. The quick release cam lock 870 can also be opened to enable the rails 850 to move in the direction of double headed arrow T to alter the vertical position of the seat along the arcuate curve defined by the rails 850 and the lock 870 can then be closed to lock the seat in that desired position. Thus, by a combination of movements, the seat can be adjusted in an area defined by the total movement of the rails 856 in channels 854 and movement of the rails 850 relative to the rails 856.

In an alternative arrangement, a pair of vertical rails 850' could be coupled to the rails 856 by a clamp fastener 860'' and the block 853' would be coupled to the rails 850' as shown in dotted lines. This would enable the rails 850' to move vertically relative to the block 853' shown in dotted lines. A clamp fastener 860' locks the rails 850' to the block 853' and fastener 860'' can allow movement of the rails 856 horizontally relative to the rails 850'.

FIG. 31 shows a modification to the embodiment of FIG. 30 in which like reference numerals include like parts. In this embodiment, a spring 880 is provided between the frame block 853 and the sleeve 872 for biasing the rails 856 forward in the direction of arrow X. Thus, when the quick release cam lock 860 is opened, the rails 856 and therefore a seat supported on the rails 850 will be biased forward (either horizontally or angularly depending on the adjusted position of the rails 850 and 856) in the direction of arrow X. By a rider using his weight against the seat, the seat can be pushed back against the bias of the spring 880 to compress the spring 880 and the seat can then be locked in a desired position by closing the quick release cam lock 860. Springs 881 and 882 are also provided between the connecting rods 852 and the sleeve 872 for biasing the rails 850 into a certain position relative to the block 853. Once again, by the user using his weight, the seat connected to the rails 850 can be pushed upwardly or downwardly against the bias of the springs 881 and 882 and then the quick release cam lock 870 can be closed to lock the seat in a desired position.

In alternative arrangements, only a single spring 881 or 882 could be used to bias the rails 850 into a desired position rather than the pair of springs as shown in the drawing.

In the embodiment of FIG. 31, only the spring 880 could be used with the springs 881 and 882 omitted. In this arrangement the rails 856 and the lock 870 together with sleeve 872 form an abutment member. Thus when the lock 870 is released and a person pushes back on a seat (not shown) connected to rails 850 the rails 850 and therefore the seat will be pushed upward due to rails 850 contacting the abutment formed by the rails 856, lock 870 and sleeve 872.

FIGS. 32 shows another embodiment of the invention which is applicable to seats used for everyday purpose in the home, office or which can be used for specialist purposes such as dentistry chairs or other chairs for medical use. The chair 600 shown in FIG. 32 comprises a backrest portion 602 and a seat portion 604. Both the backrest portion 602 and seat portion 604 are made up of a plurality of independent elements 610. In the embodiment shown in FIG. 32, the backrest 602 and seat 604 include an array of 10×20 different elements making up 200 different elements. Each of the elements 610 can be individually operated to change the contour and form in general of the seat portion 604 or backrest 602 to suit an individuals need for comfort or to rearrange pressure points to increase or decrease the pressure on a particular part of the person's anatomy for comfort or for other reasons such as efficiency or rehabilitation or biofeedback exercises.

The elements 610 could be made from spring material such as spring metal so they flex when load is applied or the contour of a person's anatomy changes.

Each of the elements 610 could be spring biased to an end position so that when a person seats on the seat, they move under the person's weight to form a contour which matches the person's weight and body contour.

FIG. 33 shows a seat embodying the invention described with reference to FIG. 32. FIG. 34 shows the invention of FIGS. 32 and 33 embodied in a bed and pillow arrangement to illustrate other supports which can use this aspect of the invention.

FIG. 35 shows in more detail the manner in which the elements 610 are spring biased and controlled. With reference to FIG. 35 (which will be described in conjunction with a seat it being understood that the same arrangement could be used in other support members such as beds, pillows and the like) each of the elements 610 (only one shown in FIG. 35) has a rod 650 connected to its underside. The rod 650 passes through an opening 651 in a fixed frame member 655 of the chair. The rod 650 has a slot 653 in a lower section of the rod 650. A spring 656 is arranged between the frame member 655 and element 610 to bias the element 610 upwardly in the direction of arrow D in FIG. 35.

A quick release cam lock 660 which is substantially identical to the cam lock described with reference to FIGS. 7 to 11 or 12 to 16, is provided for allowing and controlling adjustment of the element 610. The quick release cam lock 660 has a sleeve 661 which is coupled to the frame member 655 by a strut 657 or by any other suitable device. A rod 662 is arranged within the sleeve 661 and has a nut 663 on one end. A washer 664 is interposed between the nut 663 and one side of rod 650. The other side of rod 650 abuts the sleeve 661 or an abutment or washer provided on the sleeve 661. A lever 663 is pivotally coupled to the rod 662 and in the position shown in FIG. 35, pushes the sleeve 661 so that the rod 653 is securely sandwiched between the washer 664 and the sleeve 661 to thereby lock the rod 650 in the position shown in FIG. 35. In order to release the quick release cam lock 660 and therefore the rod 650, the lever 663 is pivoted in the direction of arrow G in FIG. 35 so that tension is removed from the sleeve 661 so that the sleeve 661 is able to move relative to the rod 662. This reduces the clamping effect of the rod 650 between the washer 664 and sleeve 661 so that the rod 650 is able to move relative to the rod 662 and sleeve 661. Thus, if a person seats on the seat, the element 610 will be pushed downwardly against the bias of the spring 656 so that the rod 650 is moved downwardly with the rod 662 being accommodated in the slot 653. Thus, the position of the element 610 is altered by being forced against the bias of the spring 656 by the force of a user. When the user has acquired a comfortable position, the lever 663 can be returned to the locked position shown in FIG. 35 so that the rod 650 is again securely clamped between the washer 664 and sleeve 661 to fix the rod 650 in position. Alternatively the lever 663 can be left open so the element 610 is not locked and can float.

A plurality of mechanisms of the type shown in FIG. 35 are of course provided and each is adjusted to enable the position of one of the elements 610 to take up a position depending on load and contour of the user and then locked in place by the quick release cam mechanism 663 to hold that position.

If a large number of elements 610 is included in the support member, a single lever could be used to operate a plurality of the elements 610 as shown in FIG. 36. In this embodiment, an elongate lever 670 is connected to a plurality of sleeve and rod mechanisms 671. The mechanisms 671 are the same as the sleeve 661 and rod 662 described with reference to FIG. 35. Thus, a single lever 670 can release and lock in position a plurality of elements 610 so that after a load is applied to elements 610 and each element takes up its position depending on the load and contour of the person concerned, the lever 670 can be pivoted into a locked position to lock the elements 610 in place. As shown in FIG. 36, the elements 610 may overlap slightly so as to completely cover a support surface of the chair, bed or the like.

FIG. 37 shows a slightly modified embodiment of the invention in which the rod 650 is provided with a ball 680 at its upper end which is received in a socket 681 connected to the element 610. The ball 680 and socket 681 allows universal pivotal movement of the element 610 relative to the rod 650 as well as the movement of the rod 650 described with reference to FIG. 35. In FIG. 37, the part of the rod below the support member 655, together with the quick release lock fastener 660 is not shown.

FIG. 38 shows an arrangement wherein the frame member 655 has a relatively large hole 655a so that the rod 650 is able to move within the hole 655a to in turn move the element 610 so the element 610 can take up a position corresponding to the movement of the rod 650 within the hole 655a. Specifically shaped holes could be used to restrict the rod to specific types of movement. In this embodiment, the rod 650 is still biased by a spring (not shown) for up and down movement as well as the sideways movement described above.

FIG. 39 shows yet a further embodiment in which the universal coupling formed by a ball 690 and a socket 691 are at the bottom end of rod 650. In this embodiment, the locking mechanism may be somewhat different to the quick release fastener shown in FIG. 35 and may comprise a clamping mechanism which clamps portions 693 of the socket 691 hard against the ball 690 to lock the ball 690 and therefore the rod 650 in a fixed position. The entire mechanism shown in FIG. 39 can be spring biased upwardly by a spring (not shown) as in the embodiment of FIG. 37.

FIG. 40 shows a modification to the embodiment of FIG. 39 in which locking of the universal coupling is possible. In this embodiment, block halves 691 are provided with hemispherical recesses 692 and half funnel-shaped recesses 693 so that when the blocks 691 are located together, a ball socket is formed from the recesses 692 and a funnel-shaped recess is formed from the recess halves 693. Rod 650 having ball 690 at its lower end is arranged so that the ball 690 seats in the socket formed by the recesses 692 with the rod 650 projecting out of the recess formed from the opening formed from the recesses 693. The blocks 691 have through holes 695. The holes 695 have large diameter ends 696 and narrow diameter outer ends 697. The spring 698 seats in the large diameter end 696 to bias the two block halves 691 apart. As is best shown in FIG. 41, a quick release cam lock 700 is provided for locking the ball 690 in the block 691 and therefore the rod 650, together with an element 610 (not shown) in place. The cam lock 700 is similar to the quick release cam locks described in other embodiments and includes the cam lever 701 which includes a boss 702 to which is fixed a rod 703. The rod 703 passes through the openings 695 and the spring 698 and a nut 704 is screwed onto the other end of the rod 703. A washer 705 may be interposed between the cam profile 706 of the cam lever 701 and the block 691. When the cam lever is in the position shown in FIG. 41, tension is released from the block 691 so that the rod 650 can move by the ball 690 swivelling in the socket formed from the recesses 692 and funnel shaped recess formed from the recesses 693. When the cam lever 701 is rotated in the direction of arrow P in FIG. 41, the cam profile 706 causes the block 691 to be squeezed together to lock onto the ball 690 so that the ball 690 and therefore the rod 650 is locked in a fixed position.

In other forms of the invention each of the elements could be actuated under computer control or bio-feedback system so that each can be individually actuated in response to weight distribution, comfort or re-positioned to distribute or rearrange pressure points or any combination of such.

Since modifications within the spirit and scope of the invention may readily be effected by persons skilled within the art, it is to be understood that this invention is not limited to the particular embodiments described by way of example hereinabove.

The claims defining the invention are as follows:

1. A seat including:
   a seat surface portion for receiving at least part of a user's buttocks, said seat surface portion being of a longitudinal length such that said seat surface portion is capable of seating only a single user and such that said seat surface portion forms the complete seat upon which the single user, in use, sits;

an abutment portion within the seat surface portion and forming part of the seat surface portion; and adjustment means for adjusting the abutment portion out of the seat surface portion so that in a first position of the seat, the single user sits with a first, seated body orientation on the seat surface portion including the abutment portion, and by adjustment of the adjusting means, the seat can be placed into a second position where the abutment portion is moved out of the seat surface portion and is inclined at an angle such that the single user sits in a second, at least semi-standing body orientation against the abutment portion whereby the abutment portion acts as a reaction surface for the buttocks of the user.

2. The seat of claim 1, wherein, in the first position, the abutment portion is substantially co-planar with the remainder of the seat surface portion, and the abutment portion and the remainder of the seat surface portion form the entire seat surface portion for receiving at least part of the user's buttocks and, in the second position upon actuation of the adjustment means, the abutment portion is moved out of the plane of the remainder of the seat surface portion into the second position so that a user can sit only on the abutment portion rather than the entire seat surface portion.

3. The seat of claim 2, wherein the abutment portion is for receiving a portion of a person's seating anatomy which covers at least a part of both of the person's ischial bones, the abutment portion being dimensioned so that the majority of the seating compression to the person's seating anatomy occurs between the ischial bones and said abutment portion and so substantially all the muscle and soft tissue surrounding said portion of the seating anatomy is not compressed or squeezed when the person is on the abutment portion.

4. The seat of claim 1, wherein the adjustment means can adjust the abutment portion from a position where the seat surface can take 100% of a rider's weight and the rider can be seated permanently on the seat surface and a position where the abutment portion is inclined and the abutment portion takes substantially none of the rider's weight but provides an abutment for a portion of the person's anatomy.

5. The seat of claim 4, wherein the adjustment means provides for intermediate adjustment between the positions referred to above so that the user can be located on the abutment portion with varying amounts of the user's weight supported by the abutment portion.

6. The seat of claim 1, wherein the abutment portion is pivotally coupled to the seat for movement from a position generally planar with the remainder of the seat surface to the second position, and wherein the adjusting means comprises a first member, a second member, the first and second members being moveable with respect to one another, a spring for biasing the first member and the abutment portion relative to the second member towards the second position.

7. The seat of claim 6 including locking means for locking the first and second members together to secure the abutment portion in any one of the first position, the second position, and a position between the first and second positions.

8. The seat of claim 7, wherein the locking means comprises a pin locatable in any one of a plurality of aligned holes in the first and second members and a cable coupled to the pin for selectively removing the pin from one of the aligned holes to enable the spring to bias the abutment portion towards the second position and to relocate the pin in another of the aligned holes to secure the abutment portion in a required position.

9. The seat of claim 1 including locking means for locking the abutment portion in a certain position.

10. The seat of claim 1, wherein the seat also includes seat positioning means for positioning the orientation of the seat, the positioning means comprising:

pivot means for enabling the seat surface to be altered in inclination by pivoting the seat surface about the pivot means.

11. The seat of claim 1, wherein the abutment portion comprises a plurality of seat portions, pivot means for pivotably moving the seat portions out of the seat surface portion and biasing means for biasing the seat portions out of the seat surface portion, and wherein the adjustment means comprises a compression lock means for locking the seat portions in a desired position at one of the first position, the second position and a position between the first and second positions.

12. The seat of claim 11, wherein the seat surface portions also includes third and fourth seat portions, and said seat includes second pivot means for pivotably moving the third and fourth seat portions out of the seat surface portion and second biasing means for biasing the third and fourth seat portions.

13. The seat of claim 12, further including second compression lock means for locking the third and fourth seat portions in any one of the first position, the second position and a position between the first and second positions so that any one of the following movements can be effected; the abutment portion made up of the first and second seat portions can move out of the seat surface portion alone; the abutment portion made up of the first and second seat portions can move together with the third and fourth seat portions; the third and fourth seat portions can move alone; and any one of the first to fourth seat portions can move independently of the other seat portions.

14. A seat including:

a seat surface portion for receiving at least part of a user's buttocks;

an abutment portion within the seat surface portion and forming part of the seat surface portion; and adjustment means for adjusting the abutment portion out of the seat surface portion so that in a first position of the seat, a user sits on the seat surface portion including the abutment portion, and by adjustment of the adjusting means, the seat can be placed into a second position wherein the user sits against the abutment portion, said abutment portion comprising a plurality of seat portions, pivot means for pivotably moving the seat portions out of the seat surface portion, and biasing means for biasing the seat portions out of the seat surface portion, and the adjustment means comprising a compression lock means for locking the seat portions in a desired position corresponding to any one of the first position, the second position and a position between the first and second positions.

15. The seat of claim 14, wherein the seat surface portion also includes two further seat portions, and said seat includes second pivot means for pivotably moving the two further seat portions out of the seat surface portion, and second biasing means for biasing the two further seat portions.

16. The seat of claim 15, further including second compression lock means for locking the two further seat portions in any one of the first position, the second position and a position between the first and second positions so that any one of the following movements can be effected: the abutment portion made up of the plurality of seat portions can move out of the seat surface portion alone; the abutment portion made up of the plurality of seat portions can move together with the two further seat portions; the two further seat portions can move alone, and any one of the seat portions can move independently of the other seat portions.

* * * * *